(12) United States Patent
Tanaka

(10) Patent No.: US 7,916,324 B2
(45) Date of Patent: Mar. 29, 2011

(54) INFORMATION PROCESSING APPARATUS AND INFORMATION PROCESSING METHOD

(75) Inventor: Satoshi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1208 days.

(21) Appl. No.: 11/131,193

(22) Filed: May 18, 2005

(65) Prior Publication Data

US 2005/0270566 A1 Dec. 8, 2005

(30) Foreign Application Priority Data

May 19, 2004 (JP) ................. 2004-149520

(51) Int. Cl.
*G06F 3/12* (2006.01)
*G06F 3/048* (2006.01)
*G06F 1/04* (2006.01)
*G05B 19/418* (2006.01)
*G06T 11/20* (2006.01)

(52) U.S. Cl. ........... 358/1.15; 715/769; 713/502; 705/8; 345/440

(58) Field of Classification Search .................. 345/440; 705/8; 715/769; 713/502
See application file for complete search history.

(56) References Cited

U.S. PATENT DOCUMENTS

| 5,414,809 | A | * | 5/1995 | Hogan et al. | 715/765 |
|---|---|---|---|---|---|
| 6,097,399 | A | * | 8/2000 | Bhatt et al. | 345/440 |
| 7,031,014 | B2 | * | 4/2006 | Ohwa | 358/1.18 |
| 2006/0036813 | A1 | | 2/2006 | Henocq et al. | 711/141 |

FOREIGN PATENT DOCUMENTS

| JP | 6-325043 | | 11/1994 |
|---|---|---|---|
| JP | 7-319338 | | 12/1995 |
| JP | 10-240459 | | 9/1998 |
| JP | 2002-063004 | | 2/2002 |
| JP | 2002063004 | A * | 2/2002 |
| JP | 2002-268846 | | 9/2002 |
| JP | 2003-014448 | | 1/2003 |

OTHER PUBLICATIONS

Office Action, dated Sep. 26, 2008, in JP 2004-149520.

* cited by examiner

*Primary Examiner* — Benny Q Tieu
*Assistant Examiner* — Mesfin Getaneh
(74) *Attorney, Agent, or Firm* — Fitzpatrick, Cella, Harper & Scinto

(57) ABSTRACT

Scheduling work is easily achieved without the necessity of an operator paying special attention to the throughput and the type of each printer and the idle time when each printer is available. An arrow is obtained when the operator performs a drag operation such as to increase the length in the vertical axis direction of an initial arrow. The length in the horizontal axis direction of the arrow becomes shorter in response to the above-mentioned drag operation. In this scheduling, all of the three available devices are used. Accordingly, the printing of the job is completed in a short printing time. Further, an arrow is obtained by a drag operation for increasing the length in the horizontal axis direction of the initial arrow. This scheduling represents that the job is executed by one device, for example, having a throughput A among the three available devices.

23 Claims, 34 Drawing Sheets

FIG.7B

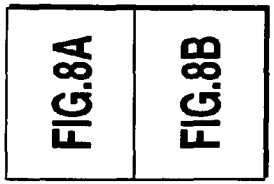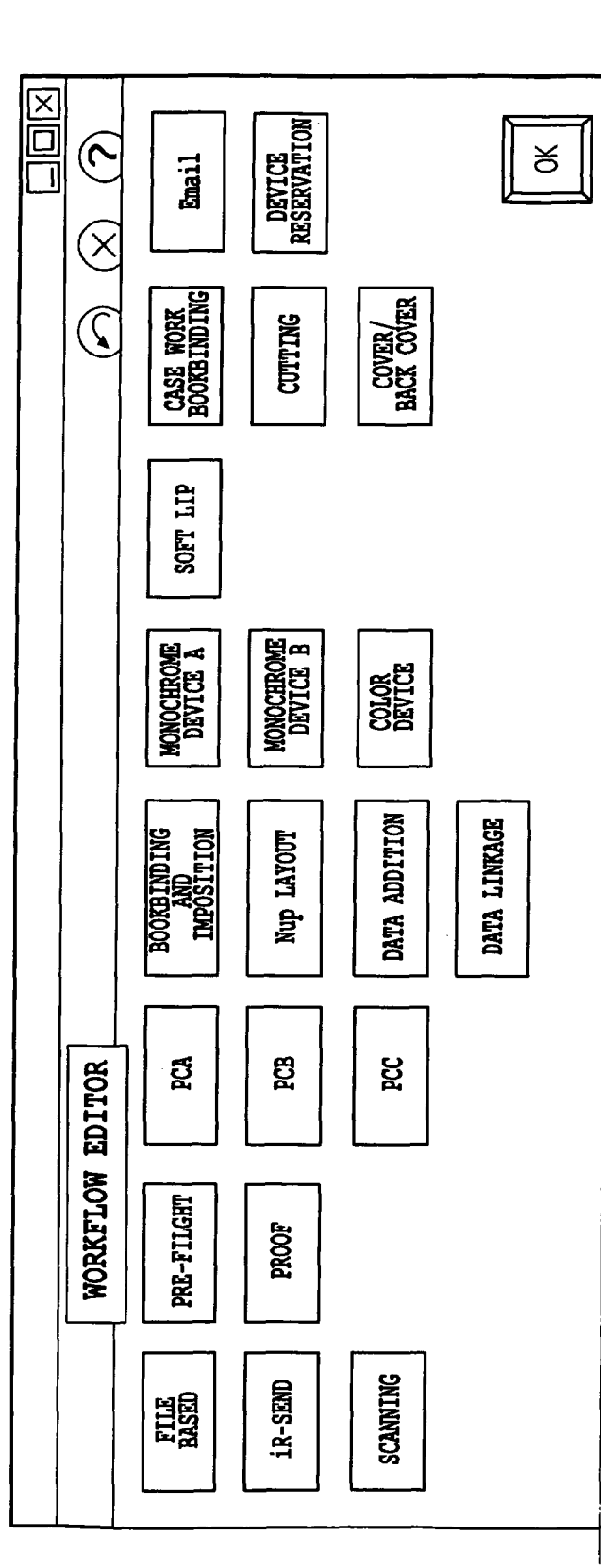

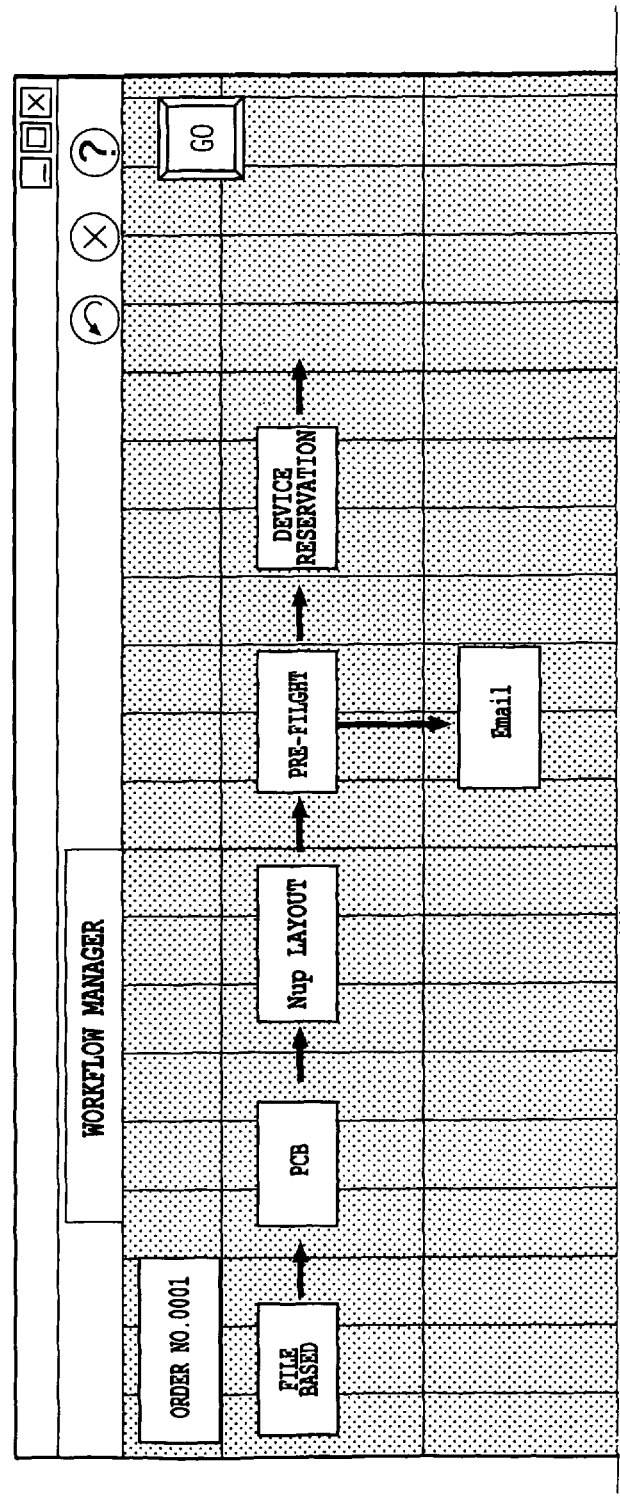

| DEVICE(D) VIEW(V) SETTING(S) HELP(H) | | | | |
|---|---|---|---|---|
| ALL ▼ | | | | |
| NAME OF PRINTER | STATUS | ADDRESS | MANAGING PERSON | INSTALLED LOCATION |
| HIGH SPEED PRINTER | PRINTING | 191.191.191.1 | SATO×○ | AISLE SIDE (NORTH) |
| COLOR PRINTER | WAITING | 191.191.191.2 | YAMADA△△ | AISLE SIDE (NORTH) |
| MEDIUM SPEED PRINTER 1 | WAITING | 191.191.191.3 | SATO×○ | AISLE SIDE (SOUTH) |
| MEDIUM SPEED PRINTER 2 | WAITING | 191.191.191.4 | SATO×○ | AISLE SIDE (SOUTH) |
| MEDIUM SPEED PRINTER 3 | WAITING | 191.191.191.5 | SATO×○ | WINDOW SIDE (WEST) |
| MEDIUM SPEED PRINTER 4 | WAITING | 191.191.191.6 | SATO×○ | WINDOW SIDE (WEST) |
| .. | .. | .. | .. | .. |

| FIG.13A |
|---------|
| FIG.13B |

FIG.13A

| | ITEM | MEANING (SETTING VALUE) |
|---|---|---|
| GENERAL ORDER INFORMATION | SERVICE TYPE | OUTPUT/BOOK BINDING SERVICE |
| | | POSTER/PANEL |
| | | COPY SERVICE |
| | | RE-ORDER |
| | | ARCHIVED DOCUMENT |
| | NAME OF ORDER | ARBITRARY CHARACTER STRING |
| | ORDER ID | 32-BYTE UNIQUE CHARACTER STRING |
| | METHOD OF SUBMISSION MANUSCRIPT | NETWORK SUBMISSION |
| | | MEDIA SUBMISSION |
| | METHOD OF FINISHING | ONE FILE → ONE DOCUMENT |
| | | PLURAL FILES → ONE DOCUMENT |
| | | PLURAL FILES → PLURAL DOCUMENTS |
| | PROOF | PREFLIGHT/PROOF PRINTING |
| | NUMBER OF UPLOADED FILES | NUMBER OF SUBMITTED FILES |
| | NAME OF UPLOADED FILE | ARBITRARY CHARACTER STRING |
| FILE INFORMATION | FILE ID | 32-BYTE UNIQUE CHARACTER STRING |
| | NUMBER OF PAGES | NUMERICAL SPECIFICATION |
| | OS TYPE | Wooooo/Mooooooooo/Uooo |
| | | Wooooooooo Wooo |
| | | Wooooooo Eooo |
| | | ... |
| | | OTHER |
| | MANUSCRIPT PREPARATION APPLICATION | |
| | APPLICATION VERSION | ARBITRARY CHARACTER STRING |

| | | |
|---|---|---|
| PRINTING STYLE | FINISHED SIZE | B0, A0, B1, A1,, |
| | ORIENTATION OF PRINTING SHEET | PORTRAIT |
| | | LANDSCAPE |
| | TYPE OF BOOKBINDING | CASE WORK BOOKBINDING |
| | | SADDLE STITCH BOOKBINDING |
| | | RING BOOKBINDING |
| | | STAPLER |
| | | OTHER (COMMENT) |
| | ORIENTATION OF BINDING | LEFT (WIDTH NON-SPECIFIABLE) |
| | | RIGHT (WIDTH NON-SPECIFIABLE) |
| | | UP (WIDTH NON-SPECIFIABLE) |
| | | OTHER (COMMENT) |
| | PRINTING (MAIN TEXT) | SINGLE SIDED |
| | | DOUBLE SIDED |
| | COLOR MODE (MAIN TEXT) | MONOCHROME |
| | | COLOR |
| | TYPE OF PRINTING SHEET (MAIN TEXT) | BLACK AND WHITE STANDARD PAPER |
| | | COLOR STANDARD PAPER |
| | | THICK PAPER (THICKNESS SPECIFIABLE) |
| | | THICK GLOSSY PAPER |
| | | COLORED PAPER (COLOR SPECIFIABLE) |
| | | MONOCHROME OHP FILM |
| | | COLOR OHP FILM |
| | PUNCH HOLE | TWO HOLES, THREE HOLES, FOUR HOLES, SIX HOLES, THIRTY HOLES |
| | FOLDING | TWO-FOLD, THREE-FOLD, X-FOLD |
| | COVER | WITH COVER |
| | | WITHOUT COVER |
| | PRINTING (COVER) | NOT PRINTED |
| | | SINGLE SIDED |
| | | DOUBLE SIDED |
| | PRINTING (BACK COVER) | |
| | COLOR MODE (COMMON TO COVER/BACK COVER) | |

FIG.13B

INFORMATION PROCESSING APPARATUS AND INFORMATION PROCESSING METHOD

BACKGROUND OF THE INVENTION

1. Field of the Invention

The present invention relates to an information processing apparatus and an information processing method, and particularly to print scheduling in a printing system capable of executing a single print job in a manner distributed to a plurality of printing apparatuses.

2. Description of the Related Art

Conventionally, commercial printing is known in which a printed matter is fabricated on request by customers such as private users and companies. In such a commercial printing industry, the printed matter is fabricated on the basis of printing data (an original) and the specification of printing style, number of copies, delivery due date, and the like provided by a customer. Then, the printed matter is delivered to the customer. In such a printing industry, printing is usually performed using large scale printing apparatuses such as traditionally known offset reproduction printing presses.

In recent years, with improvements in a printing speed and image quality of electro-photography printers and ink jet printers, the printed matter obtained by means of theses printers, which is equivalent to a printed matter obtained by means of the offset reproduction printing press, has been outputted in a short time and then delivered. Specifically, services of simple commercial printing, which excel at printing of small number of copies and a delivery in a short time and are called "copy service," "printing service," "Print On Demand (POD) center," or the like, also exist.

In each of the traditionally-existing printing industry using large scale printing apparatuses and the simple printing industry, a request for printing is made in such a manner that a customer mails to a printing company a manuscript recorded on paper or an electronic medium (such as an FD, an MO, and a CD-ROM) and a printing instruction (order instruction) which specifies the number of print copies of the manuscript, a bookbinding method, a delivery due date, and the like. Alternatively the customer directly brings the manuscript and the printing instruction to the printing company. These mailing and bringing of the manuscript and the like are generally called submission of manuscript. Further, systems have been commercially realized that allow orders of printing to be placed/received on line via the Internet or an intranet. For example, when "DotDoc.Web" provided by Fuji Xerox Co., Ltd. is used, a customer accesses from a computer of the customer's company a homepage provided by a printing company. Then, the customer fills in a printing request form with necessary information such as purchaser information (a reception address and the like), a printing style, and the number of copies, and then transmits the form together with a manuscript file. As such, the order for printing of the manuscript is placed.

In response, the printing company prepares a printing instruction related to the printing requested as described above by the customer, and thereby schedules the print processing. According to the prepared schedule, printing and bookbinding are performed respectively using a printing apparatus such as a printer and a bookbinding machine each connected to a work computer. The fabricated printed matter is delivered to the customer so that the service is completed.

As such, a printing company performs print scheduling so that printed matter of the contents satisfying the request can be delivered by a specified delivery due date. In a large scale printing center using a large number of printing apparatuses, a plurality of operators use a wide variety of printing apparatuses and work computers and thereby process a large number of printing requests (orders) in parallel. Thus, in print scheduling, it is desirable that resources such as personnel (operators) and apparatuses are used as efficiently as possible.

Conventionally, a management of printing schedules is generally performed using a scheduler. That is, information such as the status of registered print jobs and use of printing devices (printing apparatus) is managed. When a new print job is to be registered, the information is referred to so that the new job is arranged such as to be executed efficiently with respect to time.

As an example, Japanese Patent Application Laid-Open No. 2002-063004 discloses a print control apparatus comprising a plurality of output printing devices and a UI for displaying the jobs scheduled in each printing device.

Specifically, on the UI, the time arrangement of registered print jobs is first referred to for each printing device to be used for the print jobs. Then, an operator identifies printing devices that satisfy the style setting and the printing conditions specified in a print job to be set up newly, that is, printing devices that are available for the new print job. Then, the operator compares the throughput of each identified printing device with the printing amount of the print job to be set up newly. The operator, on the basis of this comparison, assigns the new print job at an idle time of a single printing device or distributes the print job at idle times of a plurality of printing devices. Obviously, in this assigning and distributing, the time arrangement of the new print job is ensured not to be later than the delivery due date.

However, the prior art printing schedule management disclosed in Japanese Patent Application Laid-Open No. 2002-063004 described above has a problem that the process of arranging a print job for a plurality of devices is complicated. For example, the operator compares the throughput of each printing device available for a print job with the printing amount of the print job. At the same time, the operator needs to perform the process of checking the idle time of each device while considering the printing amount, the delivery due date, and the like described above, so as to determine the schedule of the print job. Thus, the print job setting requires a large amount of personal determination such as that various setting conditions like throughputs and idle times are checked and that these conditions are coordinated. Further, when a print job is determined to be performed in a manner distributed to a plurality of printing devices, further determination is necessary such as the printing amount to be allocated to each device. This complicates the process further.

Further, in the prior art scheduler as described above, when a printing device becomes unavailable owing to a fault or the like having occurred before the execution of a print job or during the printing, re-scheduling is necessary in such a manner that the unavailable device is not incorporated. In such a case, the operator needs to repeat the complicated job setting process described above. Further, repeated re-scheduling of work is also complicated that is necessary when the printing device becomes available in mid-flow.

SUMMARY OF THE INVENTION

An object of the invention is to provide an information processing apparatus and an information processing method which allow an operator to perform the scheduling of print jobs without the necessity of paying special attention to the throughput of each printing apparatus and the available idle time of each printing apparatus.

In the first aspect of the present invention, there is provided an information processing apparatus for performing scheduling of a print job for a printing apparatus, the apparatus comprising:

a displaying unit for causing a display section to display a scheduling region defined by a first and a second axes where the first axis indicates throughput of the printing apparatus and the second axis indicates print time, and a job element in the scheduling region, the length of the job element along the first axis corresponding to the throughput of the printing apparatus which is used for the print job corresponding to the job element, and the length of the job element along the second axis corresponding to the print time required for the print job with the throughput of the printing apparatus which is used for the print job.

In the second aspect of the present invention, there is provided an information processing apparatus of performing scheduling of a print job for a printing apparatus, the method comprising:

a displaying step for causing a display section to display a scheduling region defined by a first and a second axes where the first axis indicates throughput of the printing apparatus and the second axis indicates print time, and a job element in the scheduling region, the length of the job element along the first axis corresponding to the throughput of the printing apparatus which is used for the print job corresponding to the job element, and the length of the job element along the second axis corresponding to the print time required for the print job with the throughput of the printing apparatus which is used for the print job.

In the third aspect of the present invention, there is provided an information processing apparatus for performing scheduling of a product produced in a producing apparatus, the information processing apparatus comprising:

a displaying unit for causing a display section to display a scheduling region defined by a first and a second axes where the first axis indicates throughput of the producing apparatus and the second axis indicates time required for producing, and a job element in the scheduling region, the length of the job element along the first axis corresponding to the throughput of the producing apparatus which is used for producing the product corresponding to the job element, and the length of the job element along the second axis corresponding to the time required for producing the product with the throughput of the producing apparatus which is used for producing the product.

In the fourth aspect of the present invention, there is provided an information processing method of performing scheduling of a product produced in a producing apparatus, the method comprising:

a displaying step for causing a display section to display a scheduling region defined by a first and a second axes where the first axis indicates throughput of the producing apparatus and the second axis indicates time required for producing, and a job element in the scheduling region, the length of the job element along the first axis corresponding to the throughput of the producing apparatus which is used for producing the product corresponding to the job element, and the length of the job element along the second axis corresponding to the time required for producing the product with the throughput of the producing apparatus which is used for producing the product.

According to the above configuration, an operator can perform the scheduling of print jobs without the necessity of paying special attention to the throughput of each printing apparatus to be used for the print job and the idle time of each printing apparatus.

The above and other objects, effects, features and advantages of the present invention will become more apparent from the following description of embodiments thereof taken in conjunction with the accompanying drawings.

BRIEF DESCRIPTION OF THE DRAWINGS

FIG. 11 is a diagram showing a display example of a device manager 605 shown in FIG. 6;

FIG. 13 is a diagram showing a relationship between FIGS. 13A and 13B, and FIGS. 13A and 13B are diagrams showing an example of contents stored in an order information file related to a print job;

DETAILED DESCRIPTION OF THE PREFERRED EMBODIMENTS

Embodiments of the invention are described below in detail with reference to the drawings.

Figure 1:
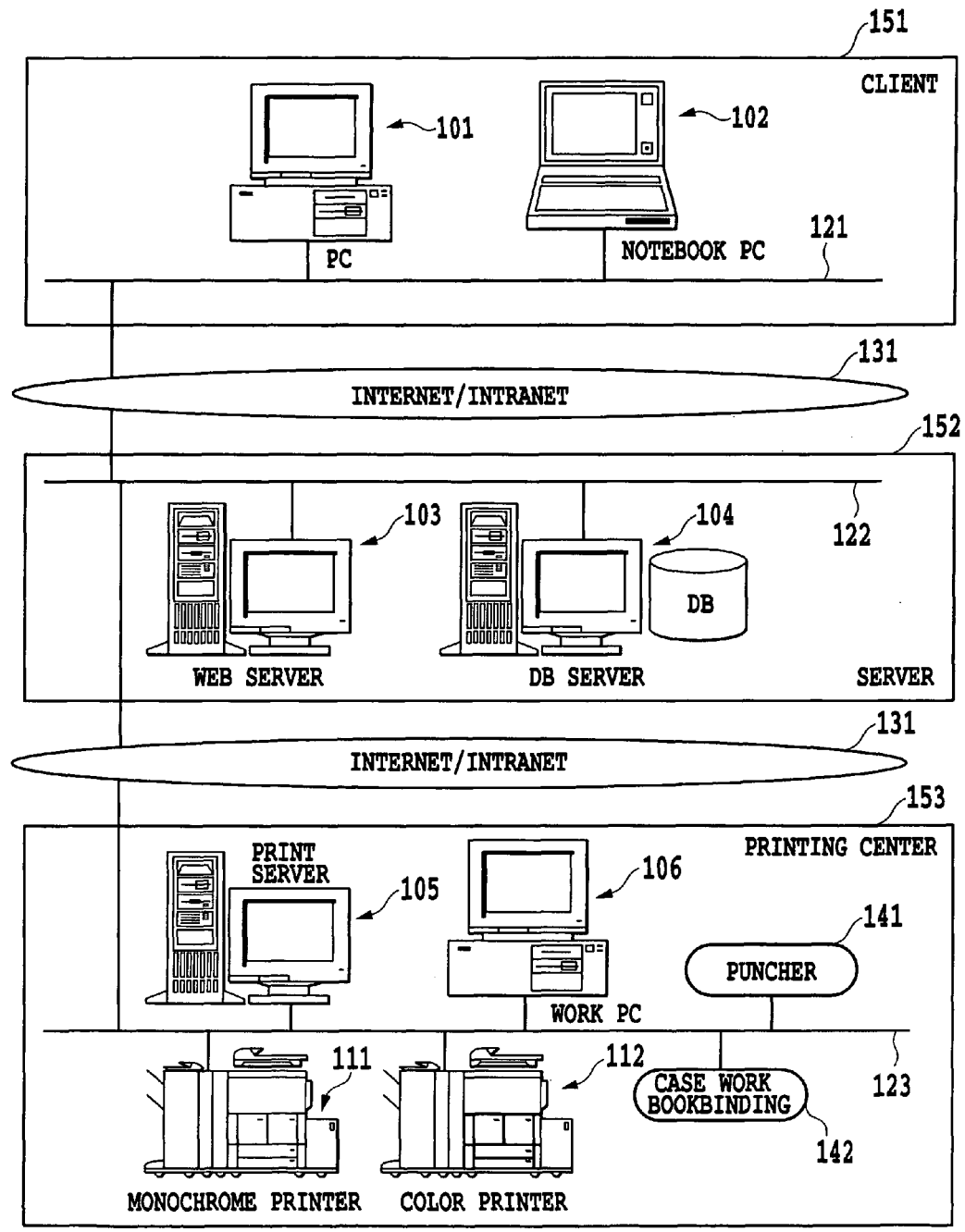
FIG. 1 is a diagram showing the entire configuration of a printing system according to an embodiment of the invention.

FIG. 1 is a diagram showing the entire configuration of a printing system according to an embodiment of the invention. The environment of the entire printing system used in the following description is selected merely for simplifying the description of the invention. Thus, the invention is not limited to such an environment as a matter of course.

In FIG. 1, a client 151 is, for example, an Internet-connected notebook PC 102 in a general user's home. The user operates the PC and thereby performs processing related to a printing request. Alternatively, the client is a business use PC 101 connected to an intranet in a company. A user operates this PC and thereby performs similar processing.

A server 152 is a WEB server 103 for providing submission contents used for the submission of a printing request and a manuscript, to a user who operates the client 151. Alternatively, the server 152 is a DB server 104 for storing the submitted printing request as an order form (order slip), as well as storing the electronically submitted manuscript. The WEB server and the DB server may be integrated in a cabinet. However, the present embodiment is described for the case that the servers are constructed separately in two cabinets.

A plurality of printing centers 153 can be present in correspondence to the server 152. On the basis of information concerning the printers installed in each printing center, the server 152 distinguishes each printing center. The printing center 153 comprises: a server 105 which periodically collects, from the DB server, order slips and manuscripts of printing which are accumulated in the DB server 104, and which performs print scheduling processing and the like according to an embodiment of the invention described later with reference to FIG. 14 and the following; a work PC 106 provided with a GUI so as to permit easy operation of various kinds of services provided by the server 105; a monochrome printer 111 and a color printer 112 for printing, respectively; and a puncher 141 and a case work bookbinding machine 142 used in off-line bookbinding. Obviously, the configuration and the environment of the printing centers are not limited to those described here.

In the present embodiment, the client 151 and the server 152, as well as the server 152 and the printing center 153, are connected through a network such as the Internet 131 or an Intranet 131. In many cases, Internet connection is adopted between the client and the server, while intranet connection through a private line is adopted between the server and the printing center. The application of the invention is not limited to such an environment. For example, another environment is also allowable that the server is located in the printing center.

In the above-mentioned configuration, a browser for permitting the browsing of the submission contents provided by the WEB server 103 is installed in the notebook PC 102 and the PC 101 serving as the client 151. In general, the browser is Internet Explorer provided by Microsoft Corporation. However, Netscape provided by Netscape Communications Corporation or the like may be used. These browsers permit the upload of manuscript data by means of the submission contents.

The submission contents provided by the WEB server 103 are provided with: edit control used for inputting a printing style such as bookbinding, a print setting such as the number of copies and a paper size, a delivery due date, client information, a delivery address, and the like; and file specification control for uploading manuscript data. Charge calculation in accordance with the contents of an inputted request, the process of establishing the inputted items, and the like are performed by a service module operating on the WEB server 103. However, its description is omitted. The WEB server 103 stores the established printing request as an order form (containing the contents of the printing request and the filename of the manuscript data) and a manuscript data file into the DB server 104.

An ordinary data base such as Oracle Database provided by Oracle Corporation is installed in the DB server 104. In response to a data acquisition request from the server 105 described later, an order form and manuscript data which are desired can be transmitted. The DB schema in the DB server 104 composed mainly of the tables of a printing center master (having, as members, information such as location and a contact address, a device master, a bookbinding machine master), a device master (device configuration information such as color/monochrome, the number of printing sheets, and options), and a bookbinding machine master (information such as a puncher and a case work book binding machine). With reference to these tables, the server 105 of the printing center 153 can receive an order assigned to its own printing center.

The server 105 in the printing center 153 receives from the WEB server 103 a notification of order establishment, and then collects an order form and a manuscript data file from the DB server 104. Then, in accordance with the collected order form, the server 105 causes an order manager, a work flow manager, a job manager, a device manager, and the like to operate with respect to printing. These managers are described later with reference to FIG. 6 and the like.

Similarly, the work PC 106 of the printing center 153 is: a console used for controlling via an operation screen the services provided by the above-mentioned various managers of the server 105; or a work computer for retrieving the manuscript data file stored in the server 105, then starting up a predetermined application so as to organize a printing style, and then performing print processing on the basis of the specified print setting.

Similarly, the monochrome printer 111 and color printer 112 in the printing center 153 are different in the installation configuration depending on the printing center. In general, a combination of a high speed monochrome printer and a high definition color printer is adopted in many cases. The usage of these printers is scheduled by a job scheduler of the server 105 as described later with reference to FIG. 14 and the following.

The bookbinding machines 141 and 142 are off-line bookbinding machines for binding the sheets printed out from each printer described above into a book. These include a stapler, a puncher, a case work bookbinding machine, a ring bookbinding machine, and the like. When these bookbinding machines are connected to a network 123, the status of printing condition can be collected. Similarly, in the case of the printers, the installation configuration of these bookbinding machines varies depending on the printing center.

Figure 2:
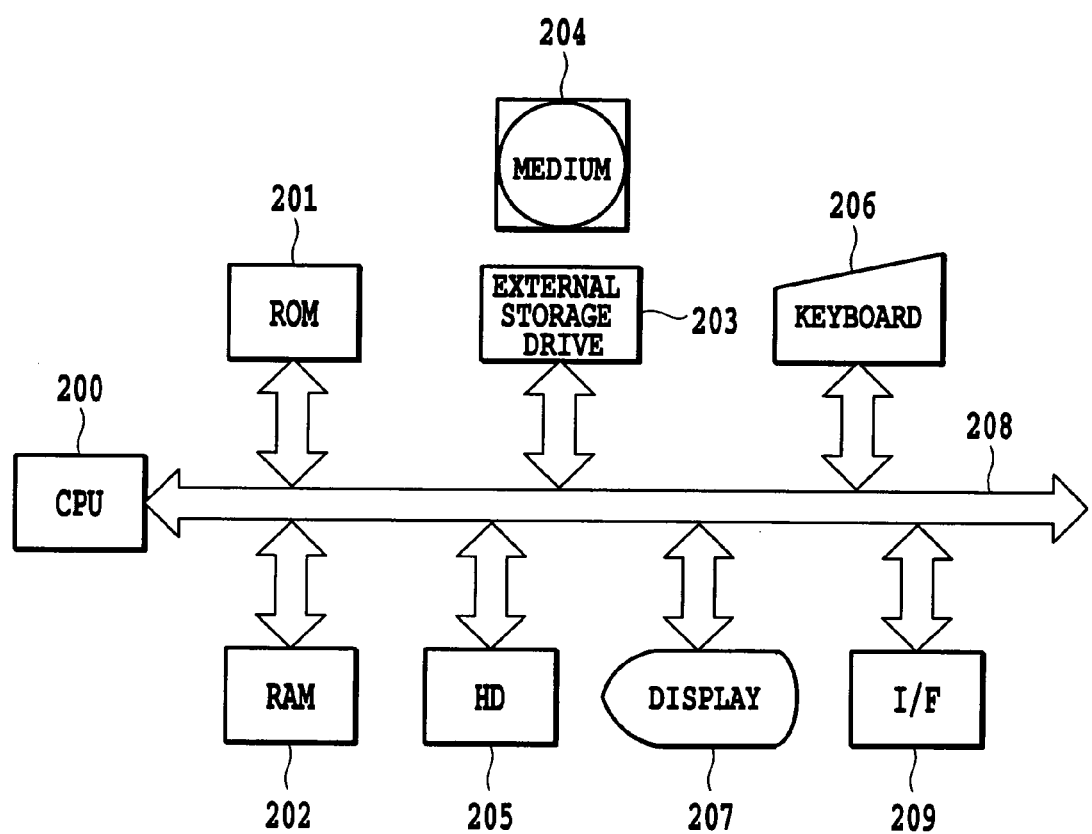
FIG. 2 is a block diagram showing the outline of hardware configuration in each of a WEB server 103, a DB server 104, a server 105, and a work PC 106 shown in FIG. 1.

FIG. 2 is a block diagram showing the outline of hardware configuration common to each of the WEB server 103, the DB server 104, the server 105, and the work PC 106 shown in FIG. 1.

In FIG. 2, a CPU 200 loads to a RAM 202 an application program, a printer driver program, an OS, a network printer control program, and the like stored on an HD (hard disk) 205, and then executes these program. The CPU 200 further performs the control of temporarily storing into the RAM 202 the above-mentioned programs, as well as information, files, and the like necessary for the execution of these programs. A ROM 201 stores: programs such as a basic I/O program; and various data such as font data and template data used in document processing. The RAM 202 serves as a main memory, a work area, and the like of the CPU 200. An external storage drive 203 loads the programs and the like stored in a medium 204, to the computer system shown in the figure. The medium 204 stores programs and associated data described later with reference to FIG. 4.

A keyboard 206 is used when a user or an operator inputs and issues an instruction such as a control command for a device, to the computer shown in FIG. 2. A display 207 displays the command inputted through the keyboard 206, the state of the devices such as the printers, and the like. A system bus 208 controls the data flow in the computer shown in FIG. 2. A network interface (hereinafter referred to as "I/F") 209 is a communications interface for connecting to a local area network (LAN) or the Internet.

Figure 3:
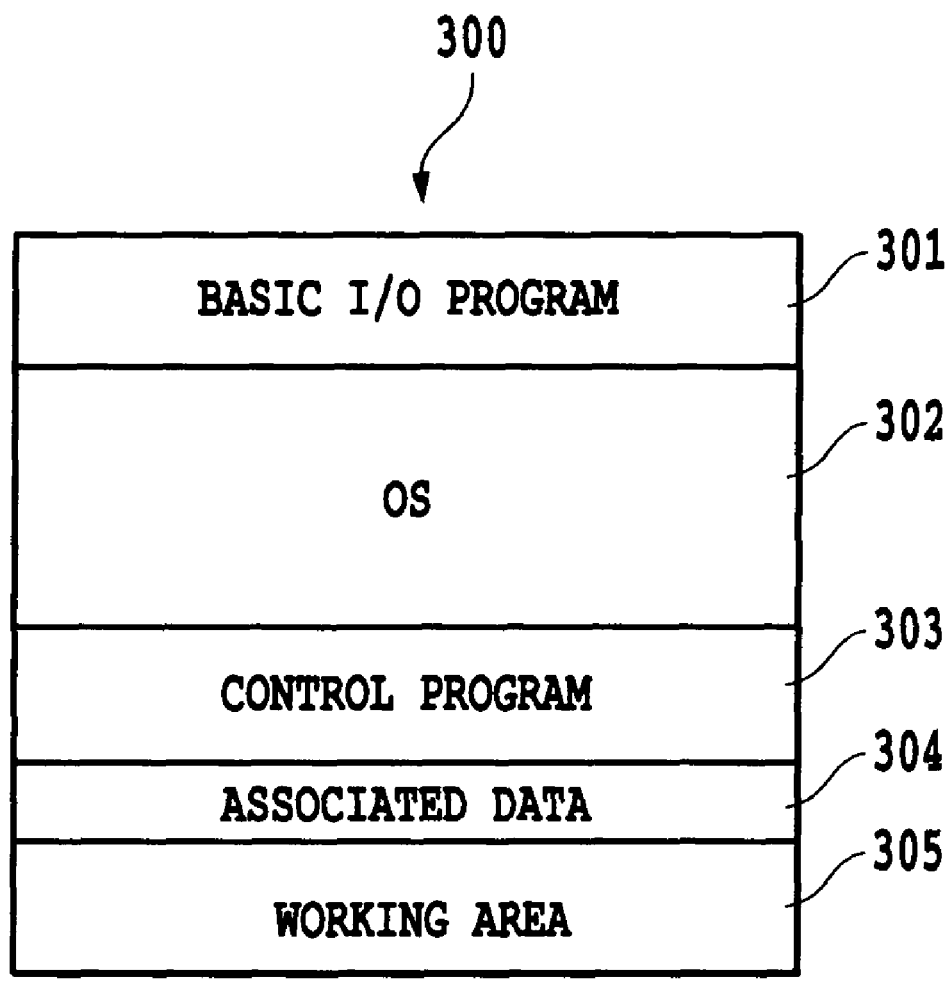
FIG. 3 is a diagram showing a memory map 300 in a state that programs have been loaded to a RAM 202 shown in FIG. 2 and are ready for execution.

FIG. 3 is a diagram showing a memory map 300 in a state that programs have been loaded to the RAM 202 shown in FIG. 2 and are ready for execution.

The present embodiment is described for an example that the programs and their associated data are loaded from the HD 205 directly to the RAM 202 and then executed. However, instead of this, at each time that a program is to be executed, the loading may be performed from the HD 205 to the RAM 202. The medium for recording the programs may be an FD, a CD-ROM, a DVD, an IC memory card, and the like. Further, the programs may be recorded on the ROM 201 in a manner constituting a part of the memory map, and thereby may be executed directly by the CPU 200. In FIG. 3, numeral 301 indicates an area for the basic I/O program. This program has an IPL (Initial Program Loading) function. That is, the program is started when the power of the apparatus shown in FIG. 2 is turned on. Then, when the OS is read from the HD 205 into the RAM 202, the program causes the OS to start operation. The OS is deployed in an area 302, a control program in an area 303, and associated data in an area 304. An area 305 is a working area used by the CPU 200 for executing the above-mentioned programs.

Figure 4:
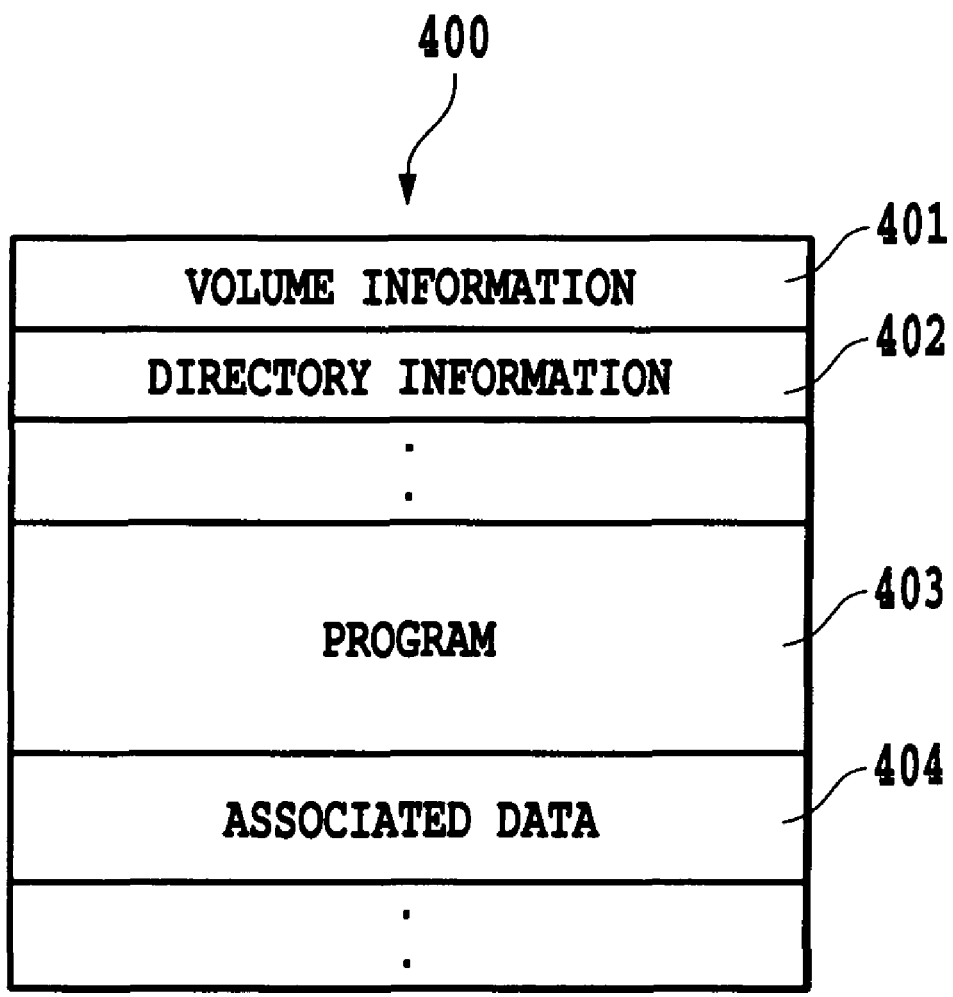
FIG. 4 is a diagram showing a data storage area 400 in a medium 204 shown in FIG. 2.

FIG. 4 is a diagram showing a data storage area 400 in the medium 204. In the figure, numeral 401 indicates an area for storing volume information that specifies information concerning data. Numeral 402 indicates an area for storing directory information. Numeral 403 indicates an area for storing a program. Numeral 404 indicates an area for storing associated data. The program stored in the area 403 is in the form of a coded program of the software described later with reference to FIG. 6 and the following.

Figure 5:
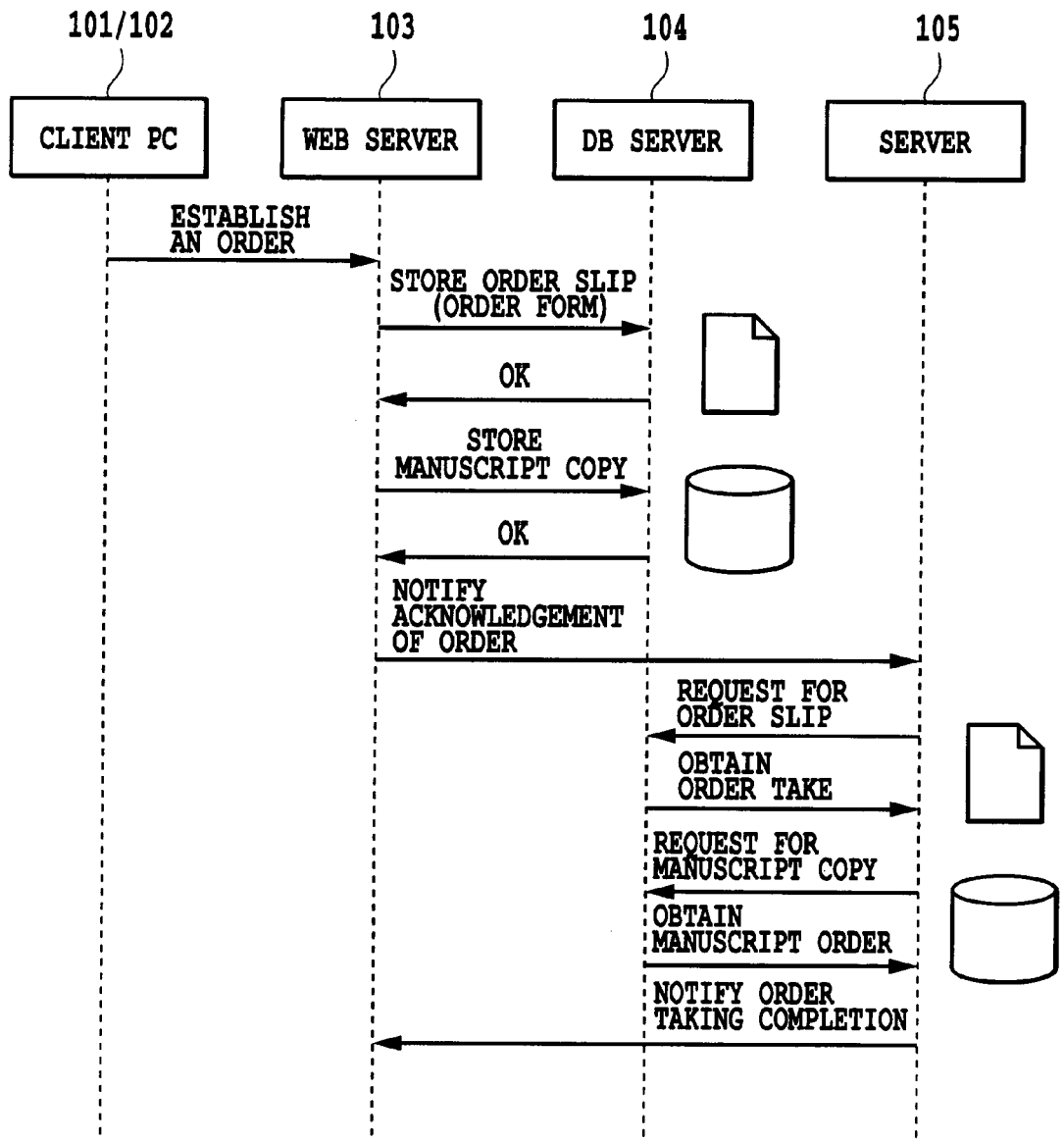
FIG. 5 is a diagram describing the sequence of information flow in a printing system shown in FIG. 1.

FIG. 5 is a diagram illustrating the sequence of information flow in the printing system shown in FIG. 1.

In FIG. 5, when the order contents inputted from the client PC 101 (or 102) is established, an order form (order slip) is prepared by the WEB server 103. The order form is stored in the DB server 104. In response, the DB server 104 notifies that the storing has been completed (OK). Similarly, when manuscript data is uploaded from the client PC 101 (or 102), the WEB server 103 stores the data into the DB server 104. Then, the DB server 104 notifies that the storing has been completed (OK).

When these storing processes are completed, the WEB server 103 transmits an acknowledgement of the received order to the server 105 of the printing center 153. In response, the server 105 requests the DB server 104 for an order form, and thereby acquires the order form from the DB server 104. Similarly, when manuscript data has been uploaded, the server 105 requests the DB server 104 for the manuscript, and thereby acquires a manuscript data file from the DB server 104. On completion of these acquisitions, the server 105 notifies the completion of order information acquisition to the WEB server 103.

By virtue of a series of these processes, the server 152 and the printing center 153 can operate in a synchronized manner. Further, the processing of the order reception in the server 152 and the print processing in the printing center 153 can be respectively performed in parallel so that the load is distributed in the entire system.

Figure 6:
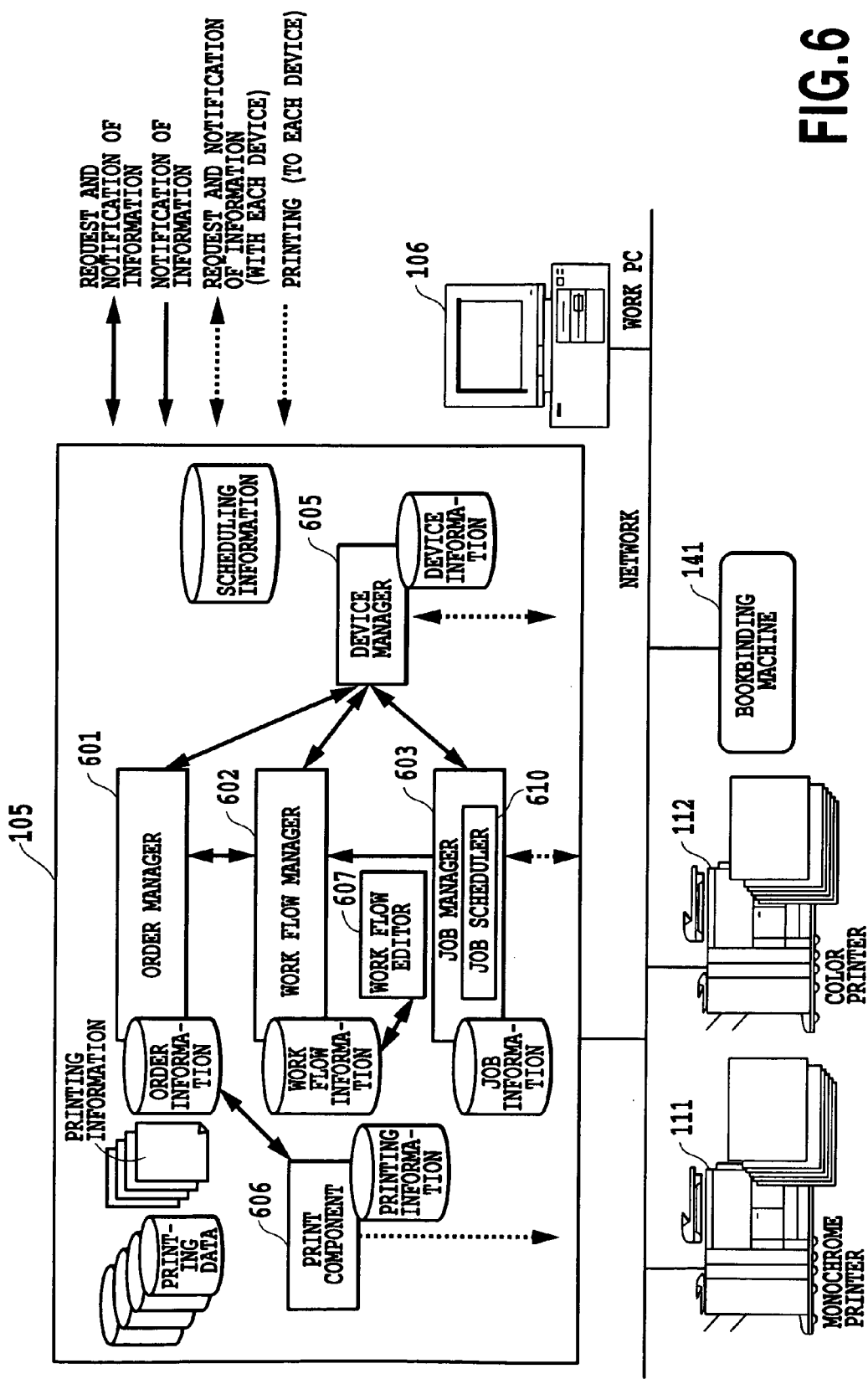
FIG. 6 is a diagram showing functional modules mainly related to printing control including print scheduling in a server 105 of a printing center 153 shown in FIG. 1.

FIG. 6 is a diagram showing functional modules mainly related to the printing control including print scheduling in the server 105 of the printing center 153. Print scheduling according to embodiments of the invention described later with reference to FIG. 14 and the following is performed by the scheduler provided by the server 105.

In FIG. 6, the order manager 601 is software for managing the printing order from the WEB server 103. The order manager 601 displays an operation screen described later in FIG. 7, and extracts printing information from the order form transmitted from the DB server 104. On the basis of this, the order manager 601 generates a path name of the manuscript data file and an order information file which is necessary for the printing. FIGS. 13A and 13B are diagrams showing an example of the contents stored in the order information file. The meaning of each stored contents is described in the list of the figure, and hence their description is omitted here.

Figures 7, 7A, 7B:
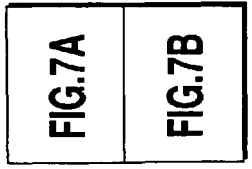
FIG. 7 is a diagram showing a relationship between FIGS. 7A and 7B, and FIGS. 7A and 7B are diagrams showing an example of an operation screen generated by an order manager 601 shown in FIG. 6.

FIGS. 7A and 7B are diagrams showing an example of an operation screen generated by the order manager 601. In this operation screen, a list display screen for describing the outlined status of orders and a tag display screen for describing the details of order information are displayed on the basis of the contents of the above-mentioned order information file. Watching this operation screen, the operator can check the progress of the orders. Further, the same order information is uploaded to the WEB server 103 in the timing of a status change. This allows similar information written in HTML to be provided to a user on the processing condition contents screen provided in the WEB server 103. This order information is retained until the printing is completed and the products are delivered. However, the order is deleted after the delivery for the purpose of confidentiality protection.

The order manager's operation screen shown in FIGS. 7A and 7B is an example of an application which operates on Windows (registered trademark) OS provided by Microsoft Corporation. Instead, this screen may be HTML based WEB contents. In the figure, the list screen in the upper part displays: IDs for identifying the orders; outline of the persons in charge; and the processing status. When an order is selected, details of the order information are displayed by using the tab screen in the lower part. The contents displayed here include the print setting shown in FIGS. 13A and 13B.

With reference to FIG. 6 again, the work flow editor 607 displays an operation screen, and generates a work flow in response to the operator's input through this screen.

Figure 8B:
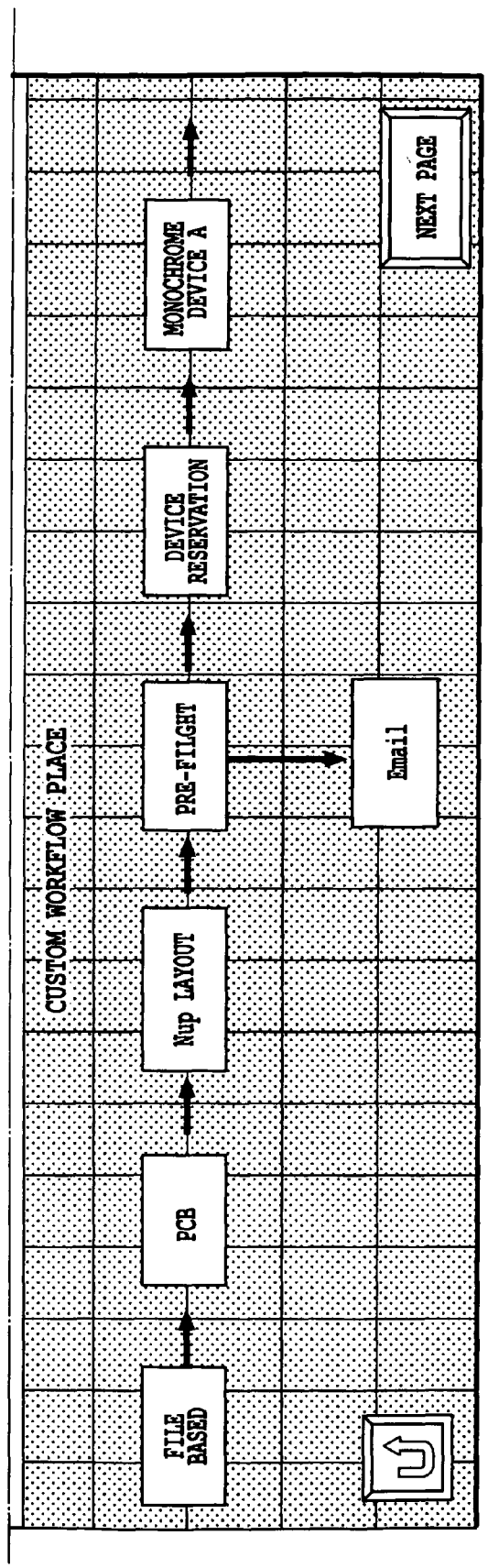
FIG. 8 is a diagram showing a relationship between FIGS. 8A and 8B, and FIGS. 8A and 8B are diagrams showing an example of an operation screen generated by a work flow editor 607 shown in FIG. 6.

FIGS. 8A and 8B are diagrams showing an example of an operation screen generated by the work flow editor 607. While referring to the order manager of FIG. 7, the operator prepares a workflow. The "work flow" indicates the processes of print processing for an order. The information prepared here corresponds to work flow information to be processed by the work flow manager 602 which is software for managing the printing work flow. Each icon (block) shown in the upper part of FIG. 8 indicates that the processing or the device expressed by the icon is performed or operated in the print processing. These icons are setup for each printing center. In accordance with the order information, the operator drags corresponding icons across the screen and thereby pastes and combines the icons in an area displayed in the lower part of FIG. 8. As a result, a work flow is generated. In the example of FIG. 8, a process is first placed for checking that the printing data for the printing is supplied in the form of a file. Then, a process is placed for checking that a PCA is used as the work PC 106. In this order information, a process is further placed for setting up a Nup layout. Then, a pre-flight process is placed so that the printed result is to be previewed on the screen. A process of E-mail is also placed for requesting the customer for confirmation and the like of the result. When a notification of confirmation and the like for the result of the pre flight is received from the customer, a process of device reservation is placed in order to perform device reservation. In this device reservation process, print job reservation is performed for each device according to processing described later with reference to FIG. 14 and the following. Then, a process of printing is placed. This process is represented by the icon of a printer to be used ("Monochrome device A" in the example of FIGS. 8A and 8B).

Then, in FIG. 6, the work flow manager 602 manages the operation and the progress of the work flow generated by the work flow editor 607 as described above.

Figure 9B:
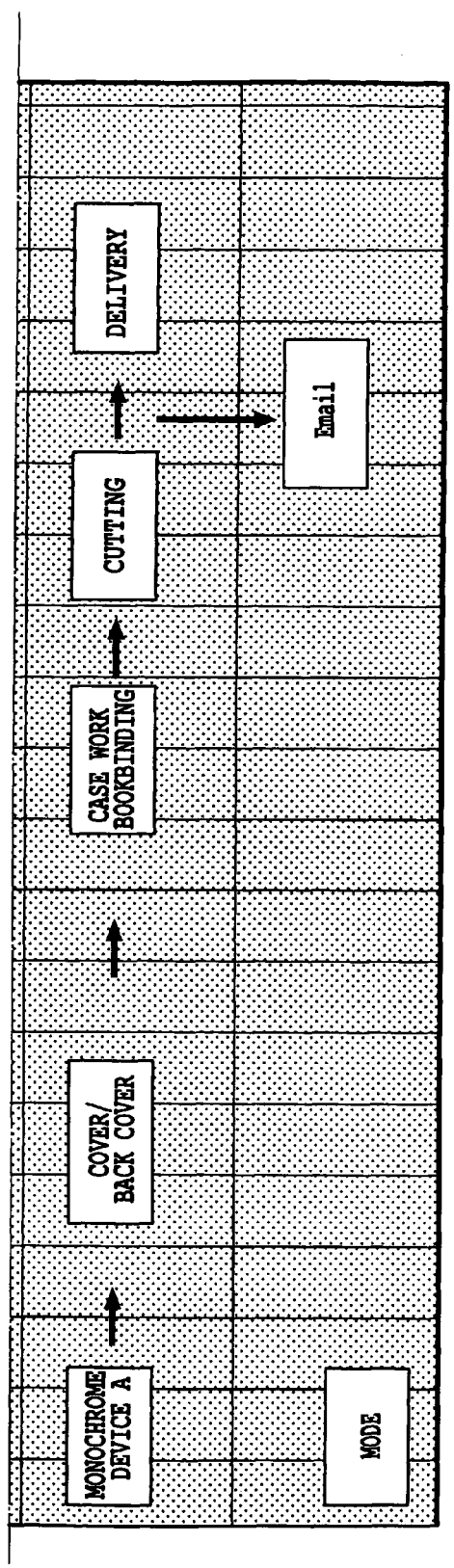
FIG. 9 is a diagram showing a relationship between FIGS. 9A and 9B, and FIGS. 9A and 9B are diagrams showing an example of a display screen generated by a work flow manager 602 shown in FIG. 6.

FIGS. 9A and 9B are diagrams showing an example of a display screen generated by the work flow manager 602. The operator performs the operation of causing the work flow manager 602 to read in the work flow generated by the work flow editor 607. Accordingly, the status of progress of the work flow is displayed as shown in FIG. 9. On the basis of the status information of the icon in the displayed work flow, the operator performs operations predetermined for each process. That is, the operator performs operations related to each process in the order according to the displayed work flow. On completion of a process, the operator performs an operation of changing the status such as the changing of the color of the completed process. However, in certain processes, the status is changed automatically. For example, when the printing device to be used is an on-line printing device, the status is changed in response to a notification of printing completion from the job manager 603.

In the process of "device reservation" in the above-mentioned work flow, the operator performs operation related to the scheduling of the print job to a printer according to embodiments of the invention described later with reference to FIG. 14 and the following.

In FIG. 6, when the process reaches the status for performing the print processing in the above-mentioned work flow managed by the work flow manager 602, the operator of the work PC 106 starts up a print component 606 of the server 105. In response, the print component 606 acquires registered printing data and printing information from the order information in the order manager 601, and then downloads the data to the work PC 106. Then, the operator selects the printing data of the corresponding order in the work PC 106, and then performs the operation for starting the printing. When the printing is started in response, the job manager 603 which is software for managing the print job communicates with the printers 111 and 112 and the like, and thereby supervises the print job.

Figure 10:
FIG. 10 is a diagram showing a display example of a job manager 603 shown in FIG. 6.

FIG. 10 is a diagram showing a display example by the job manager 603.

In FIG. 10, numeral 1101 indicates an example of an operation screen generated by the job manager 603. The screen displays information concerning the print jobs the state of which changes from time to time, and allows an arbitrary print job to be controlled. When the screen as shown in FIG. 11 is displayed, the operator can check the document name assigned to each printing data, the status (such as output, output waiting, and halt) of each print job, the time when each print job has been received, and the like. The operator can select an arbitrary job 1102 and change the status by using an input device such as a pointer.

The job scheduler 610 in the job manager 603 performs processing related to the scheduling of a print job, details of which are described later with reference to FIG. 14 and the following.

In FIG. 6, the device manager 605 performs the management of each printer installed in the printing center.

Figure 12:
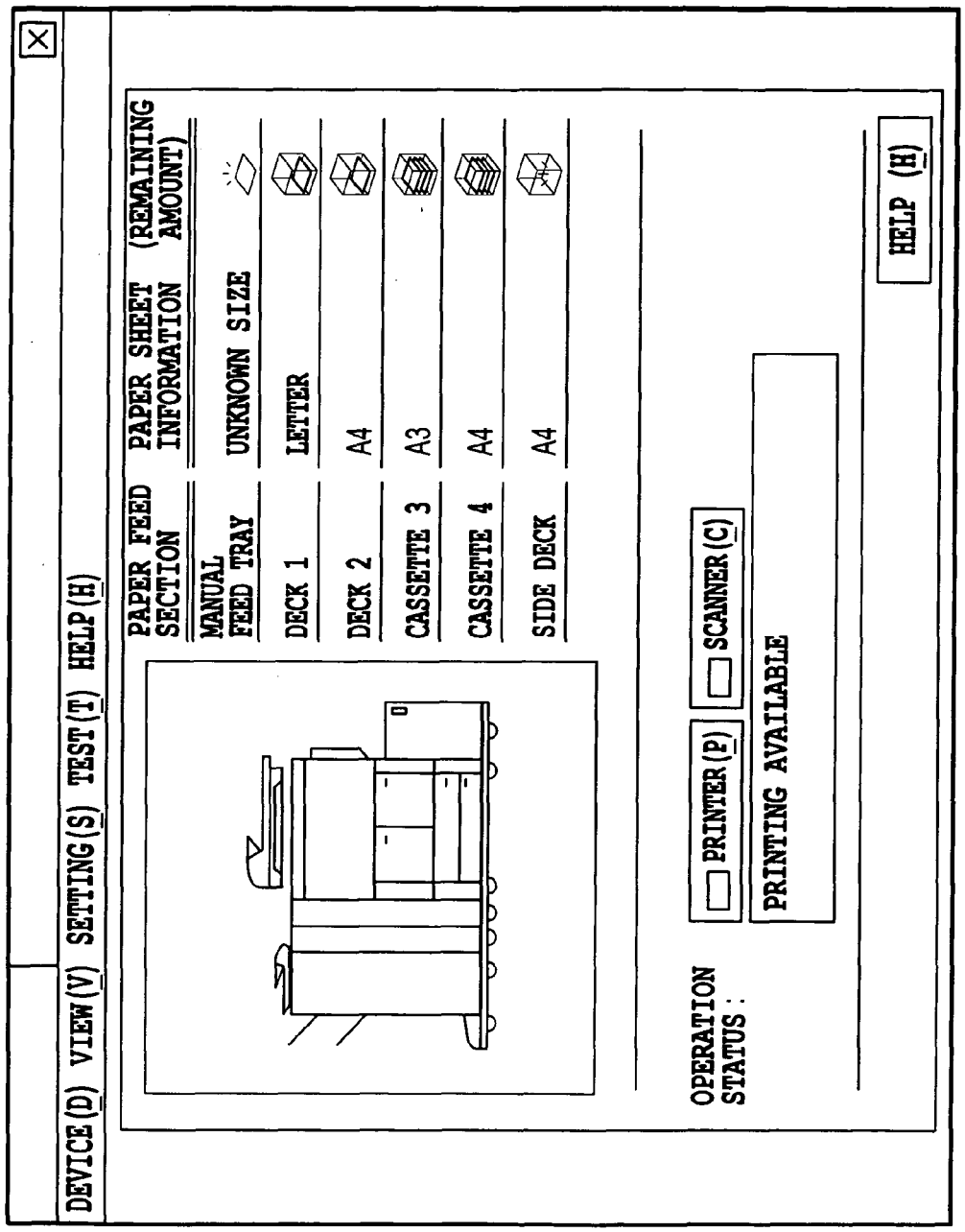
FIG. 12 is a diagram similarly showing a display example of a device manager 605.

FIG. 11 and FIG. 12 are diagrams each showing a display example by the device manager 605. As shown in FIG. 11, the device manager 605 manages and displays the installation information (the network address and the managing person) of each printer. Further, the device manager 605 communicates with each printer periodically, and thereby acquires and displays the status (the operation condition and the error/warning occurrence condition) of each printer. Furthermore, the device manager 605 communicates with each printer periodically, and thereby retains and displays the device information. The device information includes: ability information (the throughput per unit time and the finishing function such as bookbinding, staple, and punch) of the printer; and the consumables information (such as paper sheets, toner, and stapler needles) shown in FIG. 12.

The device manager 605 has the function of notifying the information concerning the device at any time in response to a request from the order manager 601, the work flow manager 602, and the job manager 603. In response to a status acquisition request from the order manager 601, the work flow manager 602 returns the status. Accordingly, the order manager 601 can display the status of the order onto the display screen generated by the order manager 601.

Next, described below is the processing related to the scheduling of the print job provided by the server 105 described with reference mainly to FIG. 6. Specifically, a job scheduler 610 associated with the job manager 603 shown in FIG. 6 performs the scheduling process of the print job. The print job scheduling according to embodiments of the invention is described below with reference to FIG. 14 through FIG. 30.

Making print job scheduling according to an embodiment of the invention is executed when the operator starts up the job scheduler 610 of the server 105 from the work PC 106 and then performs an input operation via its operation screen. That is, the scheduler 610 causes the PC 106 or the server 105 serving as an information processing apparatus to execute the processing described later with reference to FIG. 14 and the following.

Figure 14:
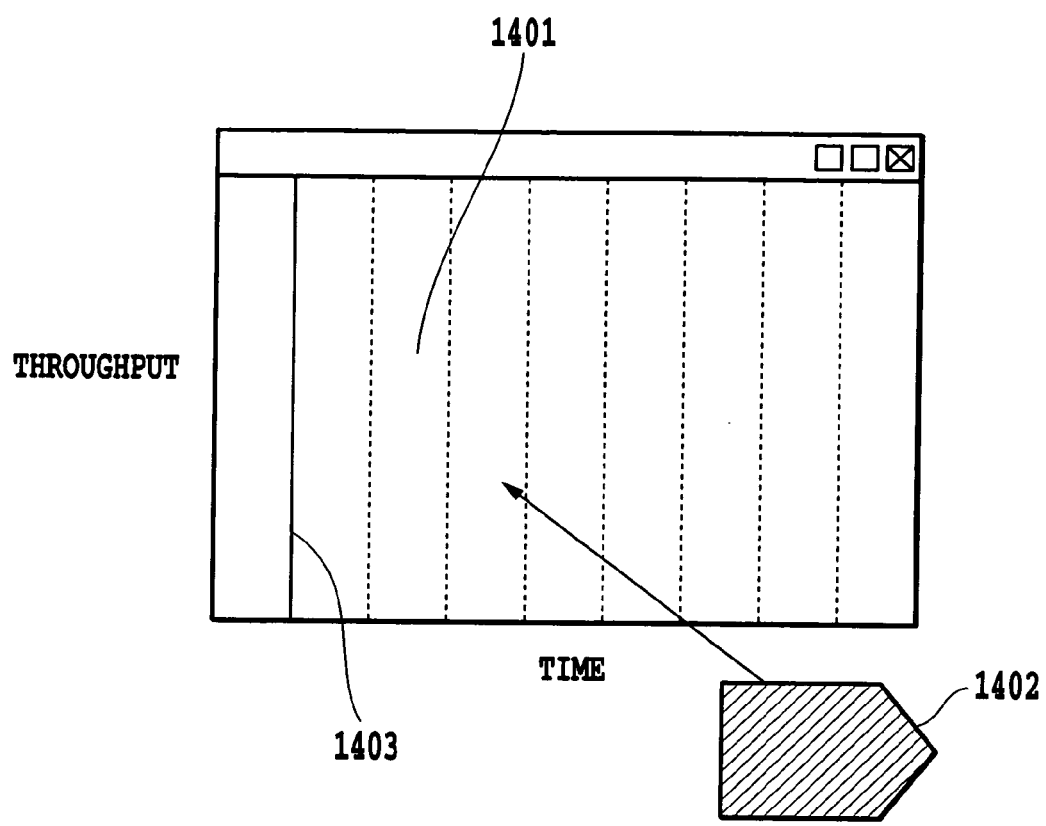
FIG. 14 is a diagram showing an initial screen for an operation screen generated by a job scheduler 610 shown in FIG. 6.

FIG. 14 is a diagram showing an initial screen for this operation screen. On the operation screen, the operator performs scheduling for each print job. As shown in FIG. 14, in the operation screen, time (or date) is set along a horizontal axis. Further, a vertical axis indicates a coordinate corresponding to a throughput of a printer (hereinafter referred to as "a device," simply) applicable to the print job to be scheduled. Then, a coordinate space made by these time and throughput is displayed as a scheduling region 1401. At the same time, an arrow 1402 indicating a job element is displayed as an initial value near the above-mentioned coordinate space. The arrow 1402 has: a horizontal length equal to the printing time necessary when the print job to be scheduled was processed by one printer having the lowest throughput among the applicable printers; and a vertical length equal to the lowest throughput. The present time 1403 of operation is also displayed.

This arrow 1402 corresponds to the print job to be scheduled.

The operator drags and pastes the arrow of the initial value in the scheduling region 1401 on this initial screen. Then the operator moves the arrow or changes the size of the arrow according to the order information such as the delivery due date of the job to be scheduled, so as to make the scheduling.

The above-mentioned arrow may be displayed in advance within the scheduling region 1401. The throughput is preferably a value representing the printout capability specified for each device, such as the number of sheets of a predetermined size which can be printed out in unit time. The vertical axis in the scheduling screen shown in FIG. 14 corresponds to the total value of the printout capabilities specified for each printing devices.

As described above, the arrow as the initial value of the job has a height equal to the throughput of a printer having the lowest throughput (that is, having the least number of sheets which can be outputted in unit time) among the applicable printers. Further, the length of the arrow is equal to the time necessary when the printout of the print job is processed by the printer having the lowest throughput. However, the invention is not limited to this configuration.

Figure 15:
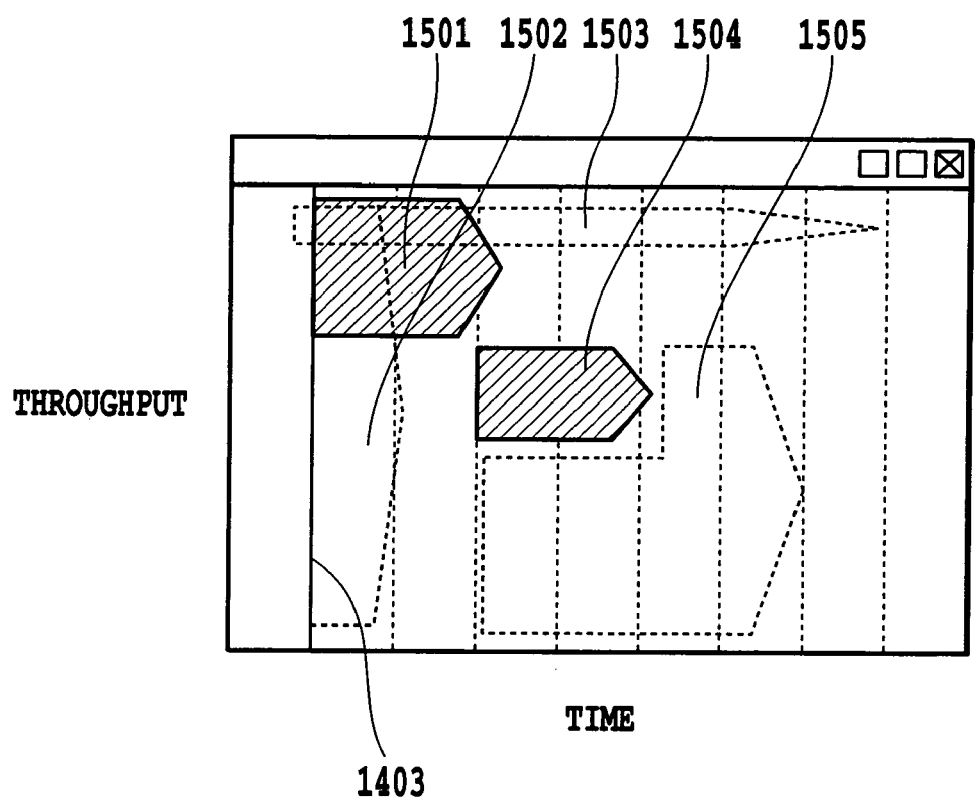
FIG. 15 is a diagram illustrating an example of a display used when the size of an arrow is changed in an operation screen shown in FIG. 14.

FIG. 15 is a diagram describing an example of a display used when the size of the arrow is changed. The same operation screen as FIG. 14 is shown.

In FIG. 15, for example, when the printing is to be started at the present time (or date) 1403, the operator first places the initial arrow 1501 such that the rear end of the arrow should align with the time 1403. Then, according to order information and the like, the operator can operate the mouse and drag one end of the arrow 1501 so as to change the size of the arrow. The arranged position of the arrow can also be moved by a predetermined operation using the mouse.

When the size of the arrow is changed, as a result of the above-mentioned drag operation, the lengths of the arrow vary stepwise in the horizontal axis direction indicating time and in the vertical axis direction indicating the throughput. That is, in the vertical axis direction, the height varies stepwise in correspondence to the throughputs of the devices applicable to the printing. For example, a case that three devices are applicable to the printing of the print job and when their throughputs are A, B, and C (A<B<C, C<A+B) will be thought. In this case, the height in the vertical axis direction of the arrow varies in seven steps of A, B, C, A+B, A+C, B+C, and A+B+C in response to the operator's drag operation for changing the arrow in the vertical axis direction.

Further, display is controlled such that the arrow should vary in the length direction following with the above-mentioned change in the height direction of the arrow. For example, when the height of the arrow is increased in the vertical axis direction, the length is reduced in the horizontal axis direction. That is, when the throughput used for outputting the print job is increased, the time necessary for printing the print job is reduced. Obviously, when the height of the arrow is reduced in the vertical axis direction, the length is increased stepwise in the horizontal axis direction. In the scheduling screen in FIG. 14, the situation can be expressed without the necessity that the operator pays special attention to individual factors such as status of use and the throughput of each of a plurality of the devices.

The above-mentioned processing is provided as a function of the job scheduler 610 stored in the PC 106 or the server 105. The displaying of the scheduling screen and the arrow representing a print job, as well as the dynamic control of the arrow performed through the mouse operation, and the like are performed by various programs executed by the CPU via the job scheduler 610.

In the example of FIG. 15, an arrow 1502 is obtained when the operator performs a drag operation such as to increase the height of the initial arrow 1501 in the vertical axis direction or reduce the length in the horizontal axis direction. This arrow 1502 represents that the maximum throughput is used. In the above-mentioned example, the total throughput A+B+C of the three devices applicable to the printout is used. In this case, the length in the horizontal axis of the arrow 1502 is reduced according to the above-mentioned drag operation so that the printing of that job can be completed in a short printing time. In contrast, an arrow 1503 is obtained when the operator performs a drag operation such as to reduce the height of the initial arrow 1501 in the vertical axis direction or increase the length in the horizontal axis direction. This scheduling represents that the job is executed by one device, for example, having a throughput A among the three applicable devices. In this case, the printing time is longer than that of the arrow 1502.

Further, as shown as the arrow 1505, when the operator specifies a certain range of time and then performs a drag operation such that the height of the arrow in the range is to be reduced in the vertical axis direction, an arrow having different heights in the vertical axis direction depending on the time can be generated even in the case of a single print job. This permits such scheduling that the combination of the devices (throughputs) used is changed depending on the time. The example of the arrow 1505 represents that the number of devices used for outputting the print job is increased at a certain stage. That is, the printout is performed, for example, by two devices until a certain time, and then one device is added at the certain time so that the printout is performed by three printers in total therafter.

In this case, an arrow 1504 of another job may be arranged so that the device not used for the job of the arrow 1505 during the above-mentioned specified time is used for another job of the arrow 1505.

Figure 16:
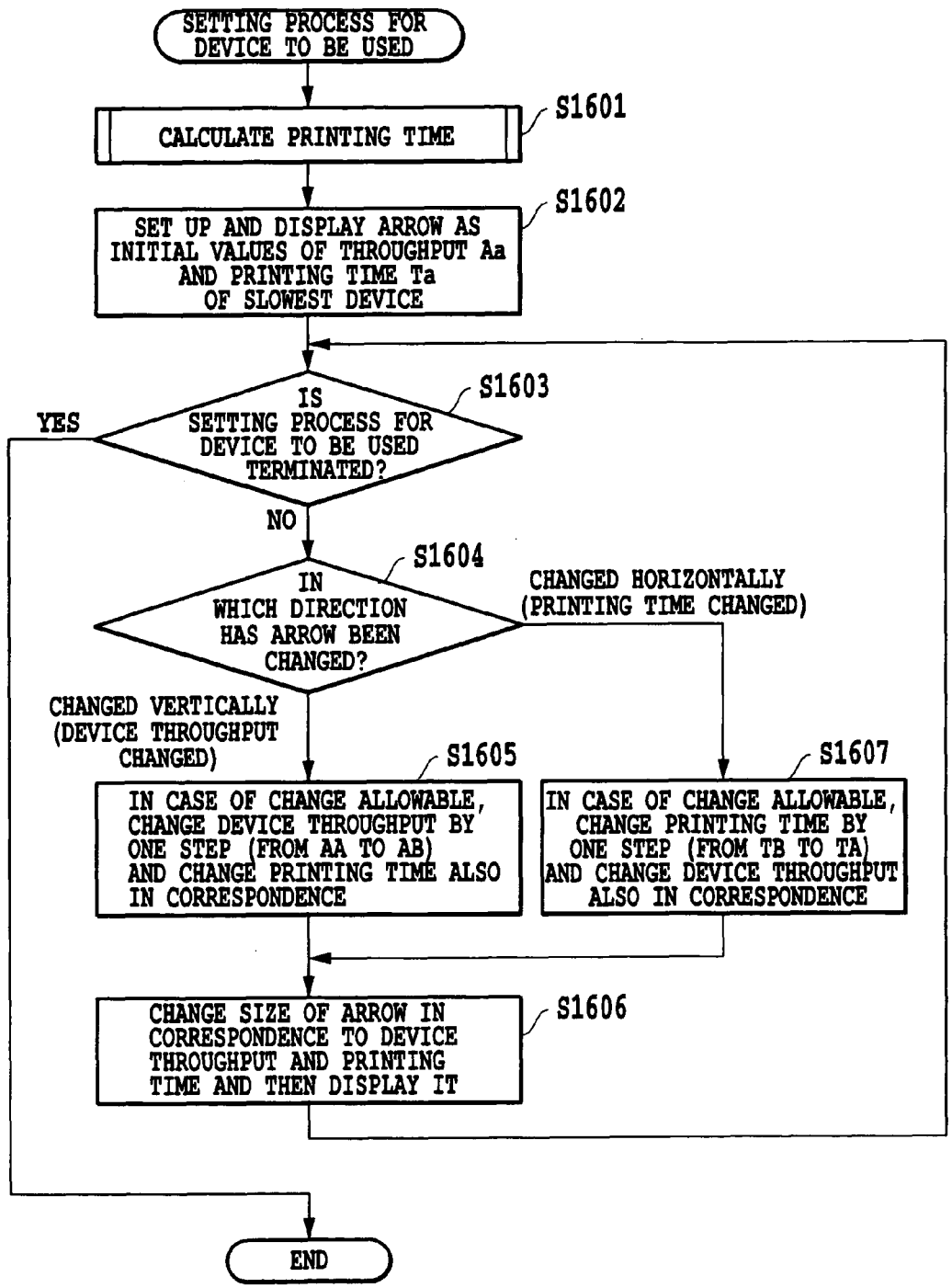
FIG. 16 is a flowchart showing basic processing of a scheduler 610 according to an embodiment of the invention.

FIG. 16 is a flowchart showing the basic processing of the scheduler 610 according to an embodiment of the present invention described with reference to FIG. 14 and FIG. 15. When the scheduler 610 is started up, the present processing is controlled and operated by the CPU. The following steps are performed by a program of the job scheduler 610 which can be controlled by the CPU.

In FIG. 16, first, at step S1601, the job scheduler 610 calculates the printing time for each printing throughput, that is, for the throughput of each printing device.

Figure 17:
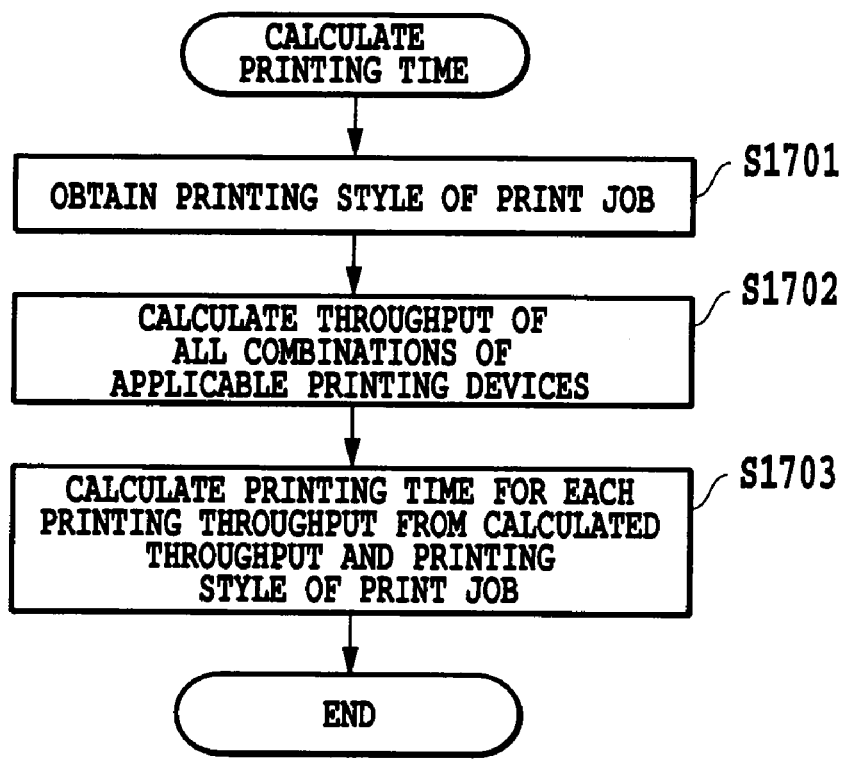
FIG. 17 is a flowchart showing the details of a calculation process for the printing time for each value of printing throughput of FIG. 16.

FIG. 17 is a flowchart showing the details of this calculation process. Each step in this flowchart is also performed by the program of the job scheduler 610.

As shown in the figure, at step S1701, on the basis of the printing information of the print job under this scheduling processing, information concerning the printing style of this job is obtained. Then, at step S1702, devices applicable to the printing are specified on the basis of this obtained printing style information. Then, possible combinations of the throughputs are calculated on the basis of each throughput. The throughput of each device may be registered in advance, or obtained from the device.

Eventually, at step S1703, on the basis of the printing amount of the print job under this scheduling processing and the printing style obtained at step S1701, the job scheduler 610 calculates the printing time of the print job for each of the calculated combinations of the throughputs.

The information calculated here is preferably stored into a predetermined storage area in a manner corresponding to the print job.

With reference to FIG. 16 again, at step S1602, the initial value 1402 for the arrow is set to be an arrow having a size corresponding to a combination of the lowest throughput. That is, an arrow is set up such as to have a vertical height corresponding to the above-mentioned lowest throughput and a horizontal length corresponding to the printing time calculated for the lowest throughput. At this step, the job scheduler 610 performs this setting, and then displays the initial arrow on the screen. As a result, the display shown in FIG. 14 is obtained. It should be noted that the arrow displayed as an initial value need not be one corresponding to the printing time obtained when a single device having the lowest throughput is used. For example, the printing time may be used that is obtained when a single device having the highest throughput is used. Alternatively, an arrow may be used that corresponds to the printing time obtained when a plurality of devices are used.

Then, at step S1603, it is determined whether the schedule setting process is to be terminated. That is, it is determined whether an operation for terminating the scheduling process has been performed as an operation of the operator performed via the operation screen. When not terminated, the procedure goes to step S1604.

At step S1604, the job scheduler 610 determines the direction of the change of the arrow performed by the operator, that is, the vertical axis direction or the horizontal axis direction. When the change is determined as in the vertical axis direction, at step S1605, processing is performed for changing the shape of the arrow in correspondence to the direction of the change. For example, when the change is such as to increase the height in the vertical direction, whether the change is allowable is determined with reference to the throughput calculated at step S1601. When the change is allowable, the job scheduler 610 changes the height of the arrow. That is, the throughput used for printing the print job is changed into a one-step higher throughput. In contrast, when the change is such as to reduce the height in the vertical axis direction, whether the change is allowable is determined with reference to the throughput calculated at step S1601. When the change is allowable, the job scheduler 610 changes the height of the arrow. That is, the throughput used for printing the print job is changed into a one-step lower throughput.

Similarly, in response to such changes, the length in the horizontal axis direction of the arrow, that is, printing time, is changed in to a one-step shorter one or one-step longer one in correspondence to the throughput changed as described above. This change is performed on the basis of the stored information obtained by performing the calculation flow for the printing time as described above. Obviously, the calculation process of the printing time may be performed at each time in response to a change in the height direction.

Then, at step S1606, the job scheduler 610 performs the operation of changing the size (shape) of the arrow in accordance with the throughput and the printing time changed as described above, and thereby displays the arrow on the screen. As a result of this processing, the change of the arrow is displayed as shown in FIG. 15.

On the other hand, at step S1604, when the job scheduler 610 has determined that the operator has changed the length of the arrow in the horizontal axis direction, the procedure goes to step S1607. At step S1607, the job scheduler 610 performs the operation of changing the shape of the arrow in correspondence to the direction of the change. For example, when the operator changes the length of the arrow such as to increase the printing time, whether the change is allowable is determined with reference to the throughput calculated at step S1601. When the change is allowable, the job scheduler 610 changes the length of the arrow. That is, the printing time necessary for printing the print job is changed into a one-step longer one. In contrast, when the change has been performed such as to reduce the length in the horizontal axis direction, whether the change is allowable is determined with reference to the throughput calculated at step S1601. When the change is allowable, the job scheduler 610 changes the length of the arrow. That is, the printing time necessary for printing the print job is changed into a one-step shorter one.

Similarly, in response to the above changes, the height in the vertical axis direction of the arrow, that is, the throughput (devices used), is changed into a one-step lower one or a one-step higher one in correspondence to the printing time changed as described above.

In the above-mentioned configuration, when the job scheduler 610 has determined that the change of the arrow performed by the operator is not allowable, the change operation is not accepted. Preferably, display is performed such as to notify to the operator that the operation is not accepted, together with the reason.

The cases that the change of the arrow is not allowable include: a case that the change of the arrow exceeds the maximum throughput or the minimum throughput; a case that the change of the arrow exceeds the printing delivery due date of the print job; and a case that the change of the arrow overlaps with another print job, that is, the change of the arrow requires the use of a printing device the use of which in another print job has been established. The control in these cases is described later.

As described above, the processing shown in FIG. 16 is performed, and then an arbitrary establishing operation such as the termination of the setting of the arrow is performed by the operator. Then, the size and the position of the arrow are established. In response to this establishment, the scheduler 610 eventually determines devices to be used.

As described above, the operator can perform scheduling of the print job without the necessity of paying special attention to the capability of the devices in the printing center 153 and the availability of the devices at a given time. Similarly, the scheduling can be performed without the necessity of paying special attention to the other print jobs already scheduled. That is, the operator may only move the arrow or change the size of the arrow within a region where no other arrow is present in the scheduling region 1401 or within a region where the change, the move, and the like of the arrow are not forbidden as described later. As a result of such a simple operation, the operator can perform optimal scheduling of the print job intuitively.

Figure 18:
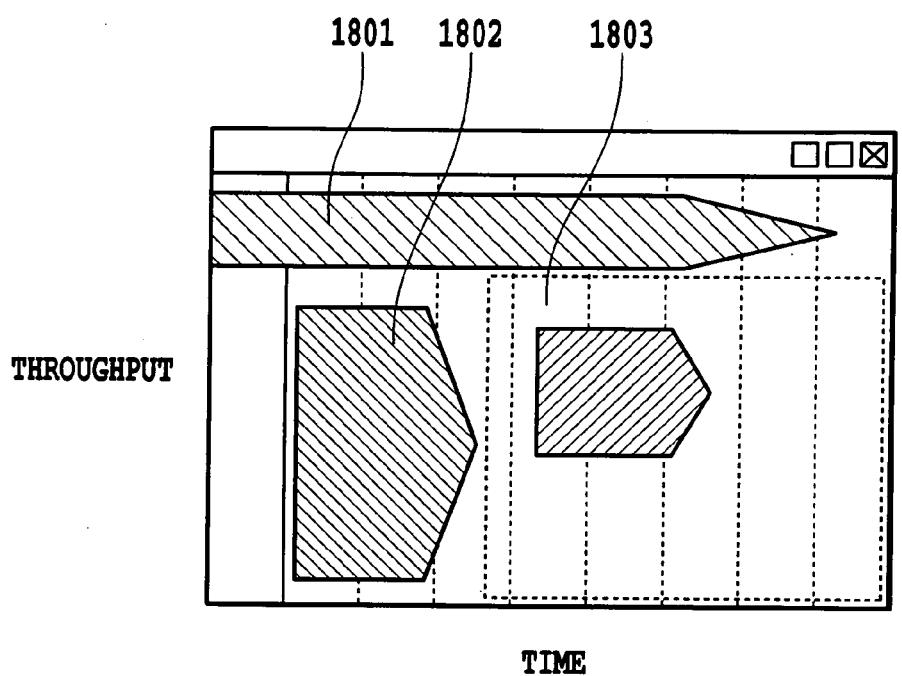
FIG. 18 is a diagram illustrating a region where an arrow can be arranged in an operation screen shown in FIG. 14.

FIG. 18 is a diagram illustrating a region where the arrow can be arranged as described above. An arrow 1801 indicates another job already scheduled and already beginning printing. An arrow 1802 indicates another job already scheduled and not yet beginning printing.

In such a situation, the operation of the job scheduler 610 is described below for the case that a new print job is scheduled. The new print job can be arranged only in an area 1803 which does not overlap with the other arrows or print jobs. The processing shown in FIG. 16 includes a process for forbidding an operation of the operator, for example, an operation for changing the size of the arrow beyond this area.

Figure 19:
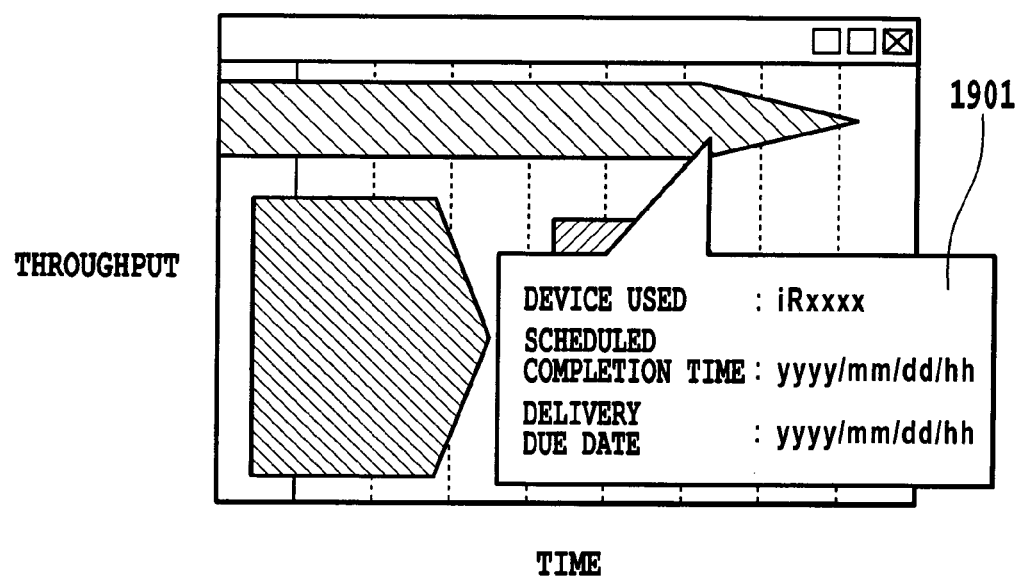
FIG. 19 is a diagram where the property of a print job displayed as the arrow is displayed in correspondence to the arrow of the job.

FIG. 19 is a diagram where the property of a print job displayed as the above-mentioned arrow is displayed in correspondence to the arrow of the job. As shown in the figure, when the operator selects an arrow and performs a predetermined operation, information 1901 is displayed concerning the corresponding job. In the case of an already scheduled job, property information is displayed such as the devices used and to be used, printing attribute information, scheduled completion time, and the printing delivery due date. This control is realized by displaying the information stored in the job manager 605.

As such, when the property information is displayed, the operator can easily obtain the detailed information concerning the print job. This is effective especially when a plurality of operators perform the scheduling work of the print jobs.

Figure 20:
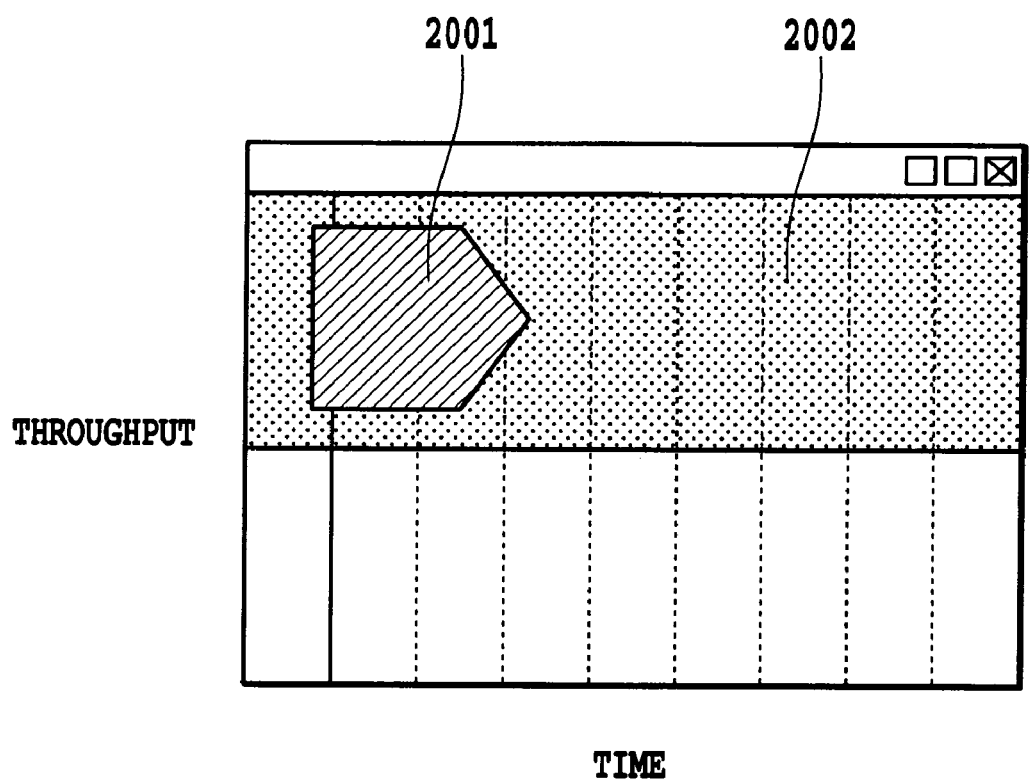
FIG. 20 is a diagram showing a scheduling screen for a print job for performing printing that has a restriction concerning the change and the like of the arrow.

FIG. 20 is a diagram showing a scheduling screen of a print job that performs printing having a restriction. For example, in the case of a print job 2001 which requires color printing, the height in the vertical axis indicating the throughput is restricted by the throughput of the devices capable of color printing. That is, the height in the vertical axis of the area shown as the area 2002 indicates the sum of the printing throughputs of the devices capable of color printing. In this case, in the arrangement of the print job 2001, the job scheduler 610 controls such that the height of the arrow should not exceed the height of the area 2002. Thus, in the management of the schedule in the printing center having color printing devices and monochrome printing devices in combination, the job scheduler 610 can place a restriction depending on the printing capability such as color printing, in addition to the restriction in the size of the arrow depending on the throughput based on the number of printing sheets. In this case, the restricted area is displayed on the scheduling screen so that the operator is allowed to make recognition. Further, a restriction process is performed for the size of the arrow.

Figure 21:
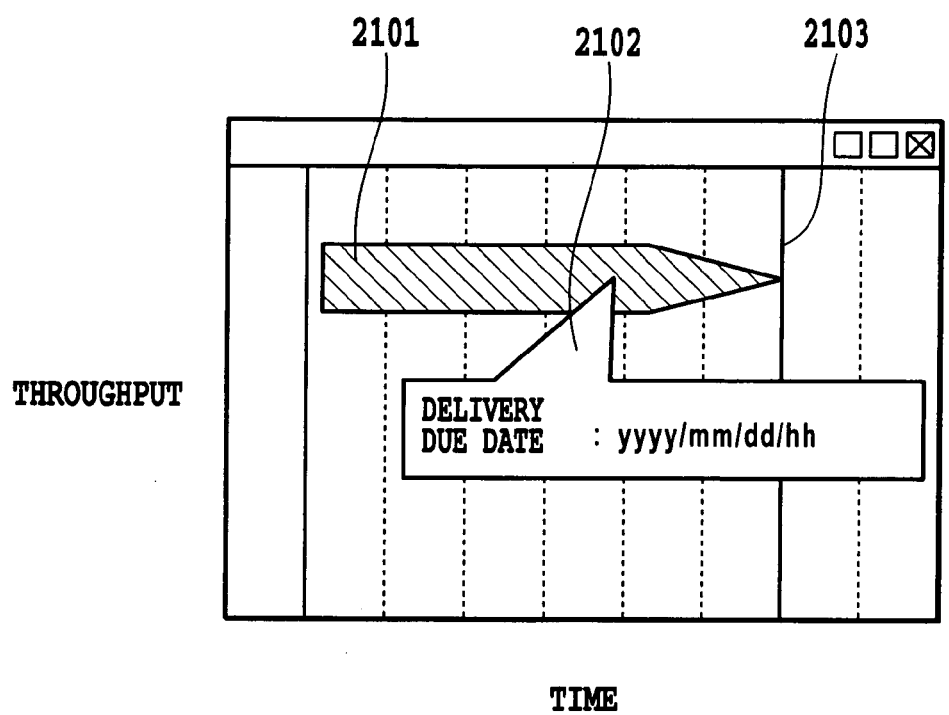
FIG. 21 is a diagram showing a scheduling screen for a print job having a delivery due date, used in scheduling employing the arrow.

FIG. 21 is a diagram showing a scheduling screen of a print job in which a delivery due date is set. In the case of a print job 2101 in which a delivery due date is set, the horizontal length of the arrow is restricted by the delivery due date information 2102 managed by the job manager 605. Thus, the job scheduler 610 controls such that the length of the arrow does not exceed the delivery due date and time. Further, when the operator performs scheduling of the print job 2101, the job scheduler 610 displays a line specifying the delivery due date and time indicated by 2103 on the scheduling screen. This allows the operator to recognize the delivery due date and time.

Figure 22:
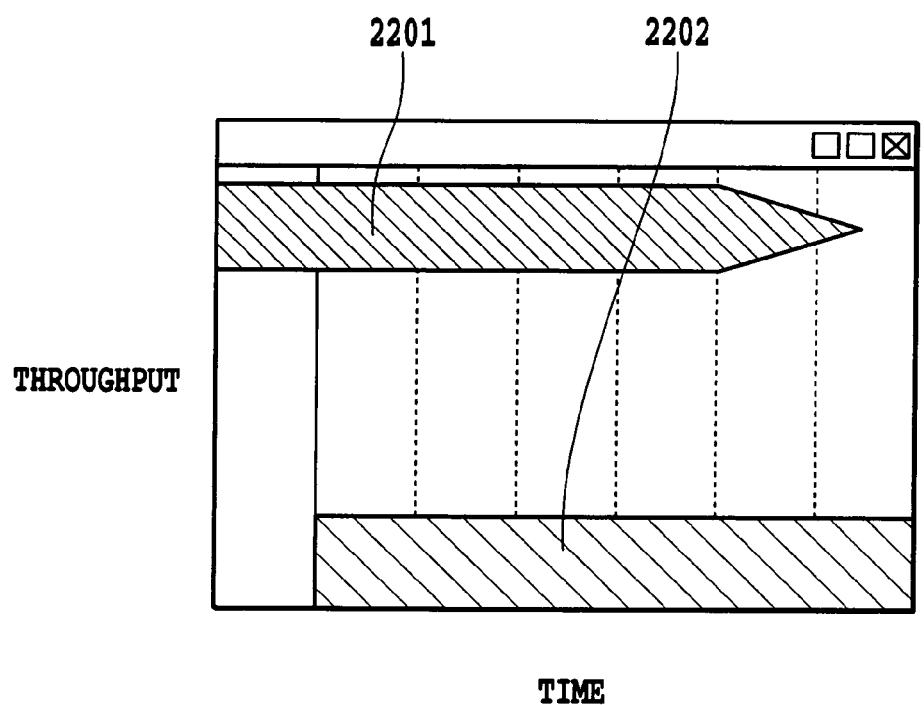
FIG. 22 is a diagram showing a screen displayed when printing becomes impossible owing to a certain abnormality that has occurred in a printing device in scheduling employing the arrow.

FIG. 22 is a diagram showing a screen displayed when a certain abnormality occurs in a printing device installed in the printing center 153 so that the printing cannot be performed in this printing device. In such a case, the job scheduler 610 displays on the screen an area 2202 having a horizontal axis corresponding to the duration after the printing device becomes unavailable and a vertical axis corresponding to the throughput of the unavailable device. Thus, the area is recognized by the operator. Specifically, the area 2202 is preferably masked using a color different from the normal background color. The area 2202 may be displayed at an arbitrary position that corresponds to the throughput of the unavailable printing device relative to the throughput of the entire printing devices. In the present embodiment, the area is displayed in a lower part of the scheduling region 1401. Further, when the printing of a print job has already been performed in the printing device having become unavailable, a printing unavailability state may be displayed in the area where the arrow corresponding to the print job is arranged.

Then, the job scheduler 610 controls such that the operation of moving or deforming the arrow into the area 2202 is to be forbidden. That is, the operator is forbidden to arrange the arrow of the print job into the area 2202. When the device becomes available, the job scheduler 610 cancels the display of the area 2202 and the arrow arrangement prohibition control for the area.

When the printing device becomes unavailable, the job scheduler 610 performs control for the job having been printed in the printing device or jobs having been scheduled to be printed in the printing device.

Specifically, when a certain printing device becomes unavailable, the job manager 605 and the job scheduler 610 determine whether any print job has been printed or has been scheduled to be printed in that printing device. When no print job has been printed or has been scheduled to be printed in the printing device, no influence occurs to the print jobs printed or scheduled to be printed in the other printing devices. Thus, the procedure does not go to the process of changing the printing schedule.

For example, in the situation of FIG. 22, the arrow 2201 corresponding to the print job is already under print processing. At this time, on the basis of the management information, the job manager 605 and the job scheduler 610 determine whether any print job has been printed in the unavailable printing device. As a result of determination, the print job 2201 has not been printed in the unavailable printing device. Thus, no control is performed forth is print job.

Figure 23:
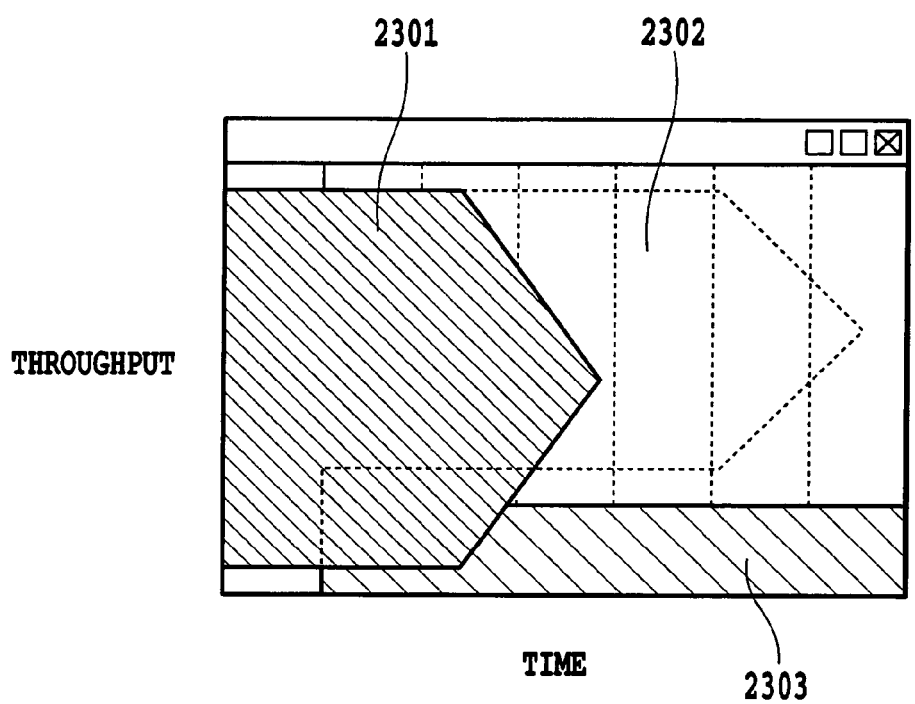
FIG. 23 is a diagram showing an operation screen displayed when a printing device used or to be used in a print job becomes unavailable owing to the lack of a remaining amount of coloring material such as toner and ink in scheduling employing the arrow.

In contrast to FIG. 22, FIG. 23 is a diagram showing a scheduling screen displayed when a printing device used or to be used in a print job becomes unavailable owing to a certain reason such as the lack of remaining amount of coloring material such as toner and ink. As shown in the figure, before the printing device becomes unavailable, the print job is expressed by the arrow 2301 which has used the entire printing throughput. However, when a part of the printing devices becomes unavailable, the printing amount having been allocated to the unavailable printing device needs to be allocated to the other printing devices. Thus, as shown in FIG. 23, the job scheduler 610 calculates the printing time for the case that the printing amount scheduled to the unavailable printing device is allocated to the other printing devices. Then, on the basis of the calculated printing time, the job scheduler 610 performs re-scheduling as shown as the arrow 2302.

Figure 24:
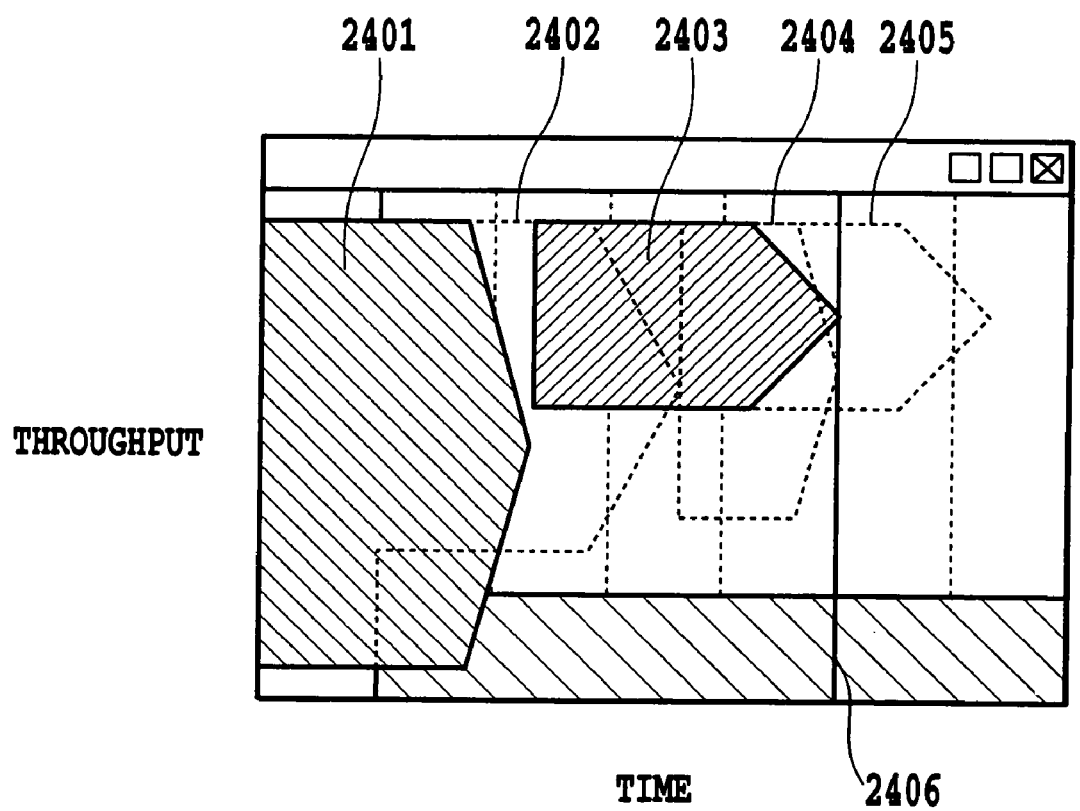
FIG. 24 is a diagram illustrating re-scheduling performed in the case where a printing device becomes unavailable when a plurality of print jobs are present in scheduling employing the arrow.
Figure 25:
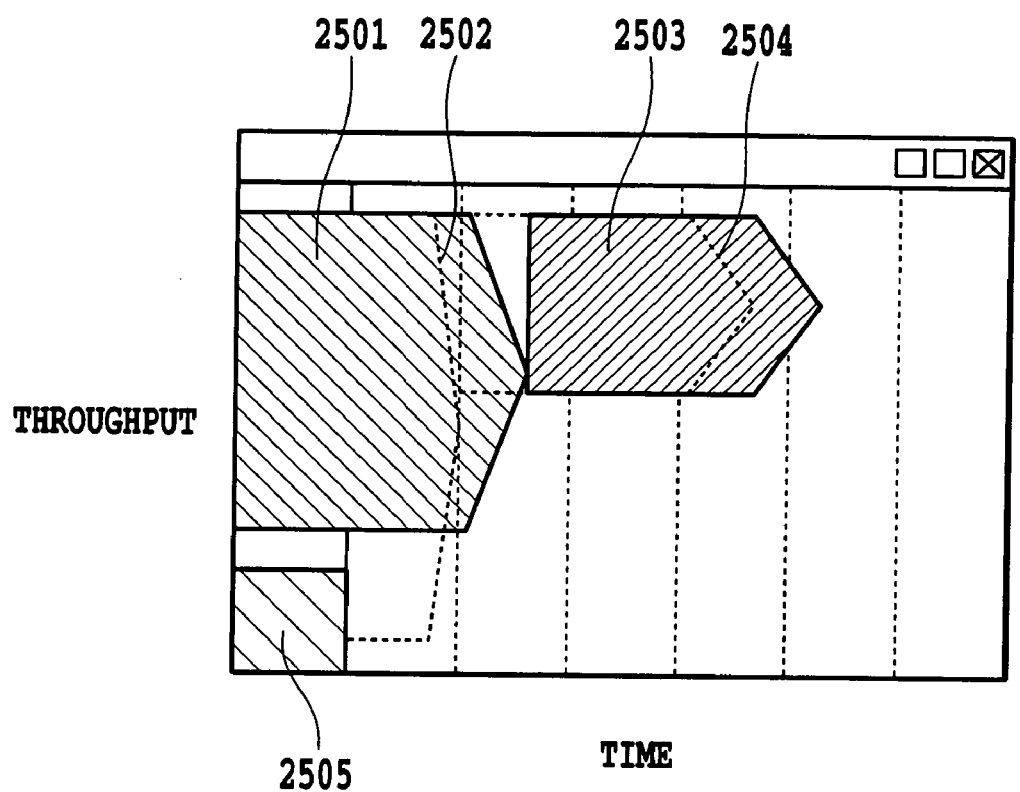
FIG. 25 is a diagram illustrating re-scheduling performed when an unavailable device has been restored in scheduling employing the arrow.
Figure 26:
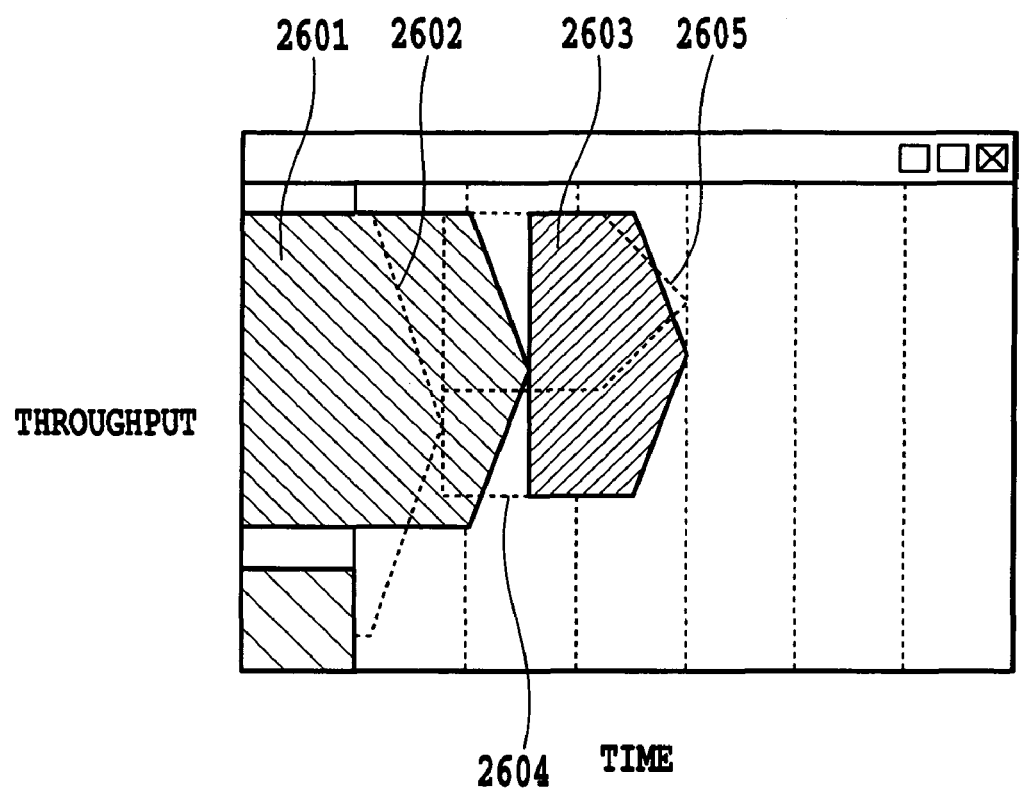
FIG. 26 is a diagram illustrating that re-scheduling varies depending on a delivery due date in scheduling employing the arrow.

FIG. 24, FIG. 25, and FIG. 26 are diagrams illustrating a re-scheduling process performed automatically after various restrictions described in FIG. 21 through FIG. 23 arise.

FIG. 24 is a diagram illustrating the transition of the screen generated by the re-scheduling of a plurality of print jobs when a certain printing device becomes unavailable in the case where these plurality of print jobs have been scheduled.

In the figure, when one of the printing devices having been used in a print job expressed by an arrow 2401 has become unavailable, the print job is re-scheduled as shown as an arrow 2402 by the job scheduler 610. At that time, when another print job expressed by an arrow 2403 is scheduled immediately after the print job expressed by the arrow 2401, in association with the re-scheduling of the arrow 2401, the job scheduler 610 delays the printing start time of the job of the arrow 2403 so as to re-schedule the job as shown as the arrow 2405. However, when a delivery due date 2406 is set up in the print job expressed by the arrow 2403, in addition to the delaying of the printing start time of the print job, the printing throughput to be used is changed so that re-scheduling is performed as shown as the arrow 2404.

Figure 27:
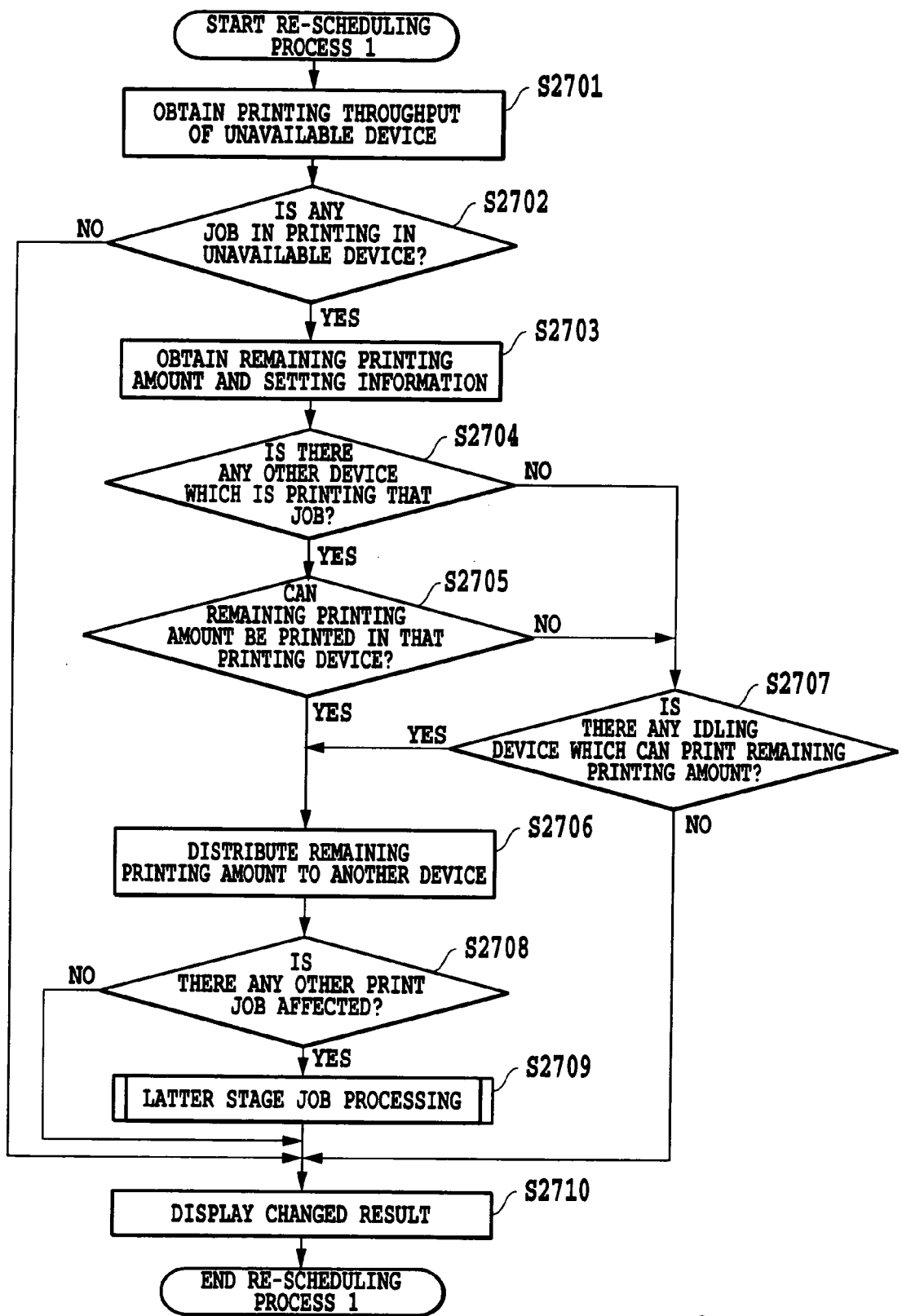
FIG. 27 is a flowchart showing a process of re-scheduling described in FIG. 24.
Figure 28:
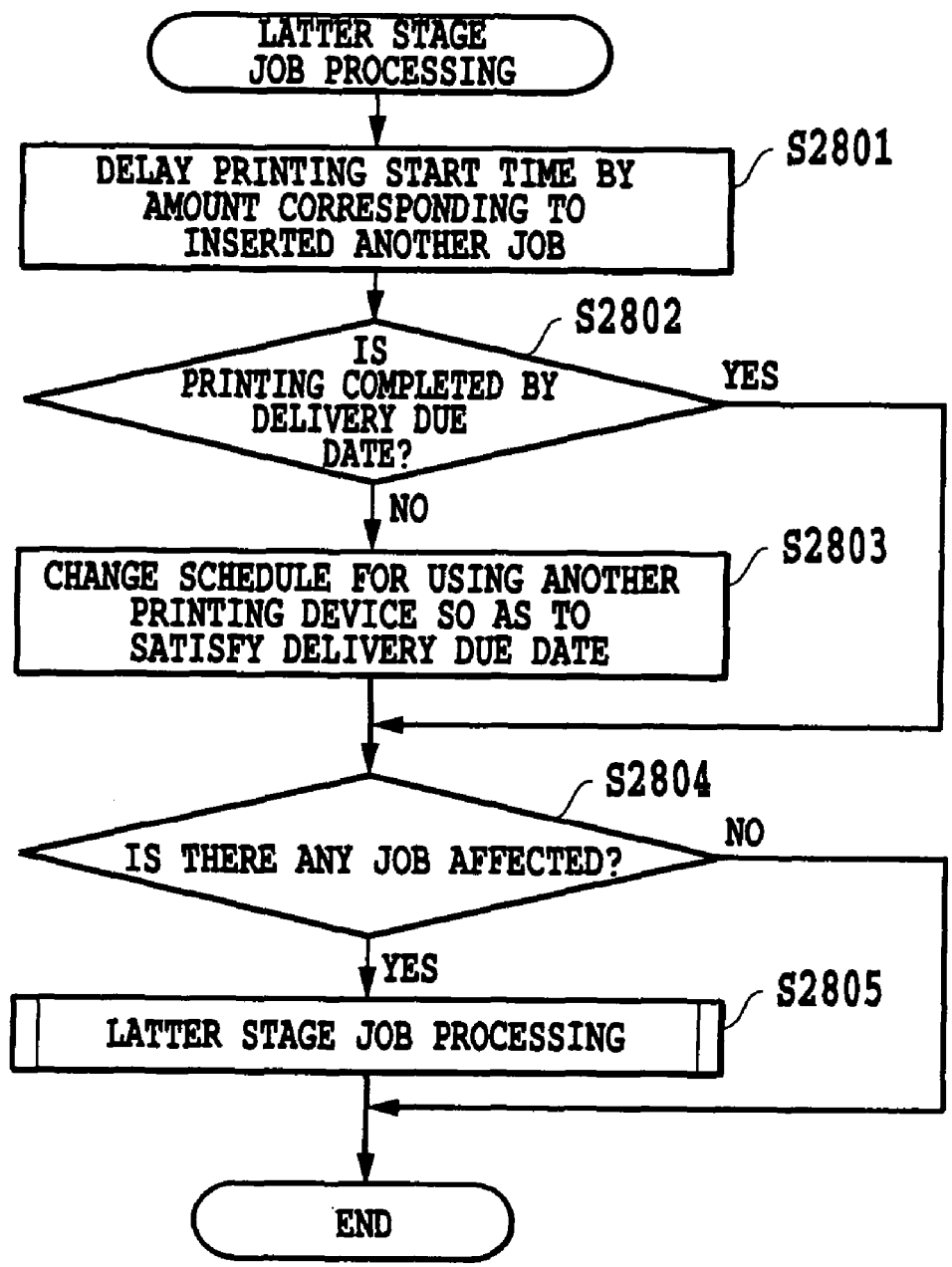
FIG. 28 is a flowchart illustrating the details of a latter stage processing of FIG. 27.

FIG. 27 and FIG. 28 are flowcharts showing the process of re-scheduling described in FIG. 24.

In FIG. 27, the job scheduler 610 first obtains the throughput of the unavailable printing device (S2701). Then, the job scheduler 610 determines whether any print job has been printed in this printing device (S2702). At S2702, when the job scheduler 610 determines that a print job has been printed in this printing device, the job scheduler 610 obtains the remaining amount of printing assigned to the printing device and the print setting information in the printing data assigned to the printing device (S2703). At S2702, when the job scheduler 610 determines that no print job has been printed in this printing device, control is performed for changing the screen such that an area is displayed corresponding to the printing throughput of the unavailable printing device (S2710) as described in FIG. 22.

At S2704, the job scheduler 610 determines whether another printing device is printing the print job concerned. When another printing device is printing, the job scheduler 610 determines whether the remaining printing amount can be printed in the printing device (S2705). This determination is performed on the basis of the print setting information obtained at S2703.

For example, a situation is assumed that the print job has color pages and monochrome pages in combination so that the color pages are printed in a printing device capable of color printing while the monochrome pages are printed in a printing device capable of monochrome printing only. Then, when the printing device capable of color printing becomes unavailable, the printing data assigned to the device requires color printing, and hence cannot be assigned a device capable of monochrome printing only. At S2705, the job scheduler performs such determination.

At S2705, when the job scheduler 610 determines that the remaining printing amount can be allocated to the printing device determined at S2704, the job scheduler 610 performs the control of allocating the printing data such that the remaining printing amount is to be printed in the printing device (S2706). As such, the re-scheduling process of the print job described above is performed.

At S2705, when the job scheduler 610 determines that the remaining printing amount cannot be allocated to the printing device determined at S2704, the procedure goes to S2707. Then, the job scheduler 610 determines whether any printing device in a halt state can print the remaining printing amount.

At S2707, when a printing device is found that is in a halt state and can print the remaining printing amount, the job scheduler 610 performs the control of allocating the printing data so that the remaining printing amount is to be printed in that printing device (S2706). As such, the re-scheduling process of the print job described above is performed.

At S2707, when no printing device is found that is in a halt state and can print the remaining printing amount, the job scheduler performs the control of changing the screen such that an area is to be displayed corresponding to the printing throughput of the unavailable printing device (S2710). In this case, the job scheduler 610 preferably notifies to the operator that the printing data having been scheduled to be printed in the unavailable printing device cannot be printed.

At S2708, the job scheduler 610 determines whether any other print job is affected by the re-scheduling of the print job performed at S2706.

When no other print job is affected, the procedure goes to S2710. Then, the job scheduler 610 performs the control of displaying the re-scheduled state on the screen.

When another print job is affected, the job scheduler 610 performs a re-scheduling process for the job at S2709. The process at S2709 is described later.

After the re-scheduling process at S2709 is completed, the procedure goes to S2710. Then, the job scheduler 610 performs the control of displaying the re-scheduled state on the screen.

The above-mentioned description has been given for the case that a single printing device has become unavailable. However, even the case that a plurality of printing devices become unavailable can be treated by returning the procedure to S2701 so that the same processing is repeated.

FIG. 28 is a flowchart illustrating the details of the processing at step S2709 of FIG. 27. A series of processings of this flowchart are performed for the print job determined to be affected by the re-scheduling process performed in the flow in FIG. 27. Specifically, a situation is assumed that the print job determined to be affected cannot be started for printing at the originally scheduled printing start time.

First, at S2801, the device having been scheduled to be used in the print job determined to be affected is not changed. Then, on the basis of the printing time necessary for printing the remaining amount allocated in FIG. 27, the scheduled start date and time for the print job is revised so that a predetermined time is set up. In this case, the device to be used is not changed. Thus, the scheduled printing completion date and time is obtained by adding the necessary printing time of the print job to the predetermined date and time.

Then, the job scheduler 610 determines whether a delivery due date is set up in the print job. Then, when the delivery due date is not set up, or alternatively in a case that the printing can be completed by the delivery due date even when the changed scheduled printing completion date and time is adopted, the procedure goes to step S2804 (S2802).

At S2802, when it is determined that the delivery due date is not satisfied if the changed scheduled printing completion date and time were adopted, the schedule is changed such that other printing devices are used so that the printing completion of the print job satisfies the delivery due date (S2803). Specifically, the job scheduler 610 changes the schedule such that the print processing is to be performed in parallel using another printing device in addition to the printing device scheduled originally. Alternatively, the schedule is changed such that the processing is to be transferred to a printing device different from the printing device scheduled originally. Further, when necessary, the correction processing of scheduled printing start date and time set up at S2801 is performed.

At S2804, the job scheduler 610 determines whether any other job is affected by the above-mentioned changing process. When no print job is affected, the procedure goes to S2710 in FIG. 27.

At S2804, when any other print job is affected, the procedure goes to S2805. Then, the job scheduler 610 performs a re-scheduling process for the print job. The processing at S2805 is the same as the flow described in FIG. 28, and hence description is omitted. Until no print job is affected by the re-scheduling process performed in FIG. 27, the job scheduler 610 repeats the same processing as that described here.

Then, a re-scheduling process is described below that is performed when the unavailable device restores to an available state.

FIG. 25 shows a screen displaying a re-scheduling result in that case.

In this case, first, the area 2505 (shaded area in the figure) indicating the throughput of the unavailable device is canceled. Then, the print jobs having been printed or scheduled to be printed in the printing device concerned are re-scheduled such as to become close to the state realized before the unavailable state has occurred. For example, when a print job having used the entire throughput before the printing device has become unavailable is changed as shown as the arrow 2501 in correspondence to the unavailability of the printer, the print job is re-scheduled such as to use the entire throughput in correspondence to the restoration of the unavailable printing device. As a result, the print job becomes as expressed as the arrow 2502.

The print job of an arrow 2503 scheduled in the downstream of the print job of the arrow 2501 has been re-scheduled in correspondence to the re-scheduling of the print job of the arrow 2501 caused by the occurrence of the unavailable device. However, when the unavailable device restores and then the print job of the arrow 2501 is re-scheduled as shown as the arrow 2502, the print job of the arrow 2503 is re-scheduled as shown as the arrow 2504.

FIG. 26 shows a screen displaying a re-scheduling result in which the delivery due date information is taken into account in addition to the situation described in FIG. 25. In correspondence to the restoration of the unavailable printing device, the print job of the arrow 2601 is re-scheduled as shown as the arrow 2602. The processing so far is as the description given above in FIG. 25.

Then, in correspondence to the re-scheduling process of the print job of the arrow 2601, the job of the arrow 2603 is also re-scheduled. When this print job has originally been scheduled as shown as the arrow 2605, this print job is obviously re-scheduled such as to return from the state of the arrow 2603 into the state of the arrow 2605.

However, when a delivery due date is set up in this print job, the job scheduler 610 determines whether the printing can be completed by the delivery due date when re-scheduled into the state of the arrow 2605. In a case that it is determined that the delivery due date is satisfied when the print job is re-scheduled into the state of the arrow 2605, this print job is re-scheduled such as to use the originally scheduled printing device. In contrast, when it is determined that the delivery due date is not satisfied, the print job is re-scheduled, for example, into the state of an arrow 2604 such that the printing is to be completed by the delivery due date.

Figure 29:
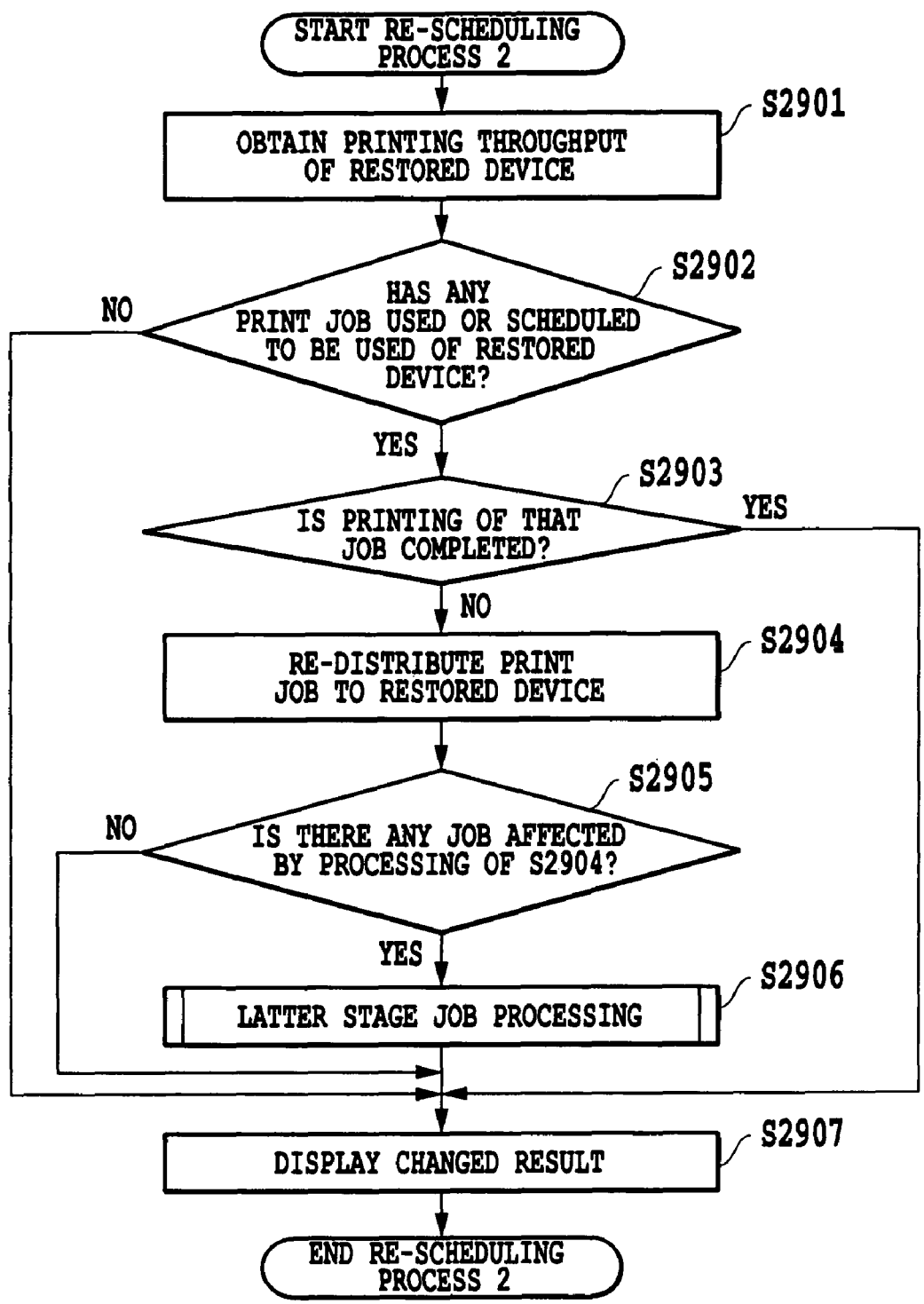
FIG. 29 is a flowchart showing a process of re-scheduling described in FIG. 26.
Figure 30:
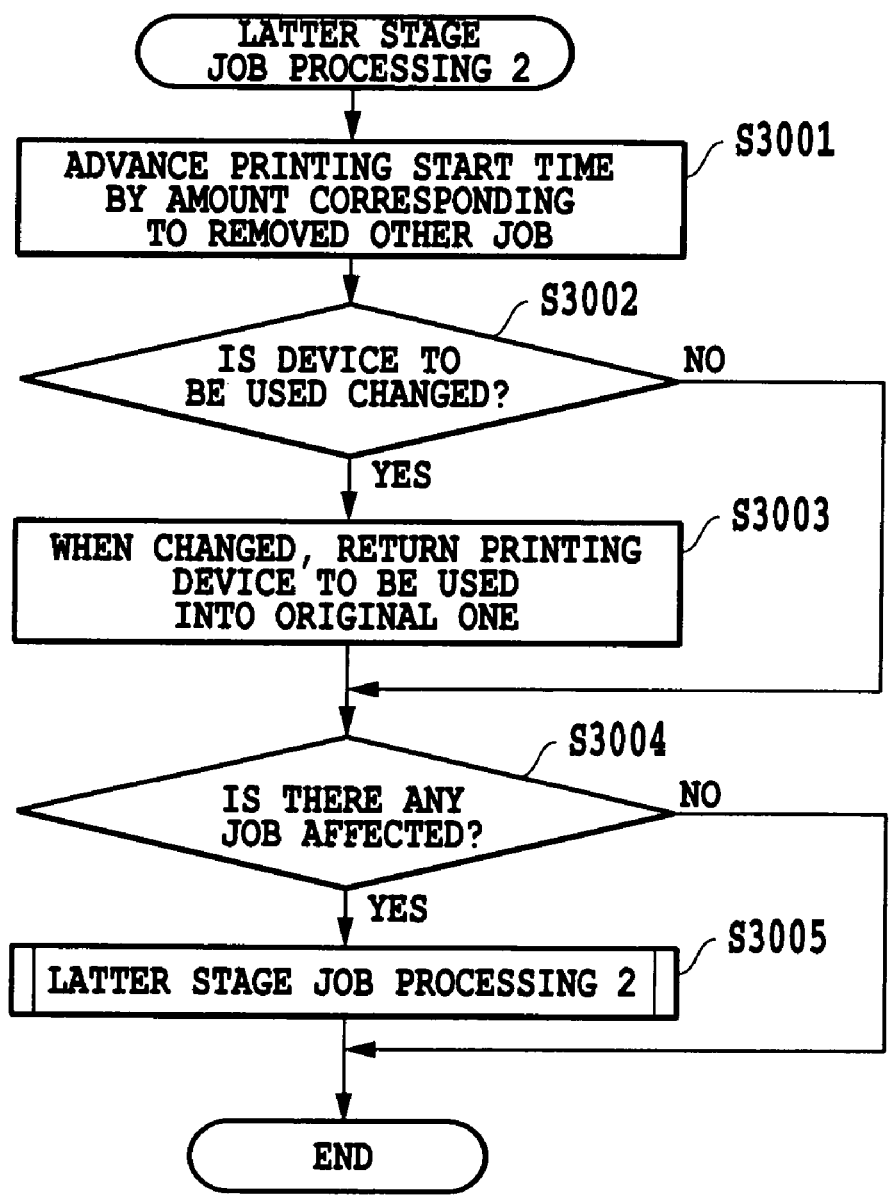
FIG. 30 is a flowchart illustrating the details of a latter stage processing of FIG. 29.

FIG. 29 and FIG. 30 are flowcharts showing the process of re-scheduling described in FIG. 26.

In FIG. 29, the job scheduler 610 first obtains the information concerning the throughput of the printing device which was restored from an unavailable state (S2901). Then, the job scheduler 610 determines whether any job has been printed or is scheduled to be printed in this printing device before the printing device has become unavailable (S2902).

When such a print job is found, it is determined whether the print job has already been completed (S2903).

At S2903, when the printing is already completed, the procedure goes to S2907. At S2903, when the printing has not yet been completed, the job scheduler 610 performs the control of allocating an arbitrary amount of the printing data of the print job the printing of which is not yet completed, to the printing device having become available (S2904).

Then, the job scheduler 610 determines whether any print job has been affected by the re-scheduling process of the print job at S2904 (S2905). When any print job has been affected, a re-scheduling process for this print job is performed (S2906). This processing is described later. Then, at S2907, the job scheduler 610 performs a display process for displaying the re-scheduling result on the screen.

FIG. 30 is a flowchart describing the details of the re-scheduling process of step S2906 of FIG. 29.

First, on the basis of the changed situation of the re-scheduled print job in the flow of FIG. 29, the printing start date and time of the affected print job is changed into a value earlier than the present setting date and time (S3001).

Next, the job scheduler 610 determines whether the printing of the print job concerned is changed into a printing device other than the originally scheduled device in correspondence to the occurrence of an unavailable device or whether a printing device is further assigned in addition to the originally scheduled printing device (S3002). When the printing device has been changed, the setting is returned such that the printing is to be performed in the originally scheduled printing device (S3003). At that time, when the printing completion is determined to become later than the delivery due date if the device to be used were reset into the state before the change, a scheduling process is performed such that the delivery due date is to be satisfied.

Then, the job scheduler 610 determines whether any other print job has been affected by the re-scheduling process of the print job (S3004). When any print job is affected, a re-scheduling process for the print job is performed according to a flow similar to that described here (S3005). This processing is repeated until it is determined that no print job is affected. When no print job is affected, the procedure goes to S2907 of FIG. 29 so that the processing is completed.

As described above with reference to FIG. 20 and the following, according to the re-scheduling process performed in correspondence to various scheduling restrictions including the delivery due date, these restrictions are displayed in the scheduling region. This allows the operator to move the arrow or change the size of the arrow while recognizing the restrictions in the scheduling work of the print job. Further, the scheduling process can be performed without the necessity of paying special attention to information such as the throughput and the specification of a plurality of printing devices.

The re-scheduling is performed automatically in response to the occurrence of the above-mentioned restrictions and their cancellation. This reduces further the work of the operator in the scheduling of print jobs. Further, even when a re-scheduling process occurs automatically, re-scheduling can be performed such that the state returns to the originally scheduled state. The above-mentioned re-scheduling performed automatically in response to the occurrence of the above-mentioned restrictions and their cancellation is performed, for example, as an interrupt process to the processing of the scheduler 610 shown in FIG. 16.

(Another Embodiment)

In the embodiment described above, the shape of the element for representing a print job on the operation screen for scheduling has been an arrow. However, the shape of the print job element is obviously not limited to this. Any shape such as a rectangle may be used as long as the element can express the throughput and the printing time as lengths on the screen and can be recognized as an integrated element having these lengths.

In the operation screen for scheduling, the vertical axis has indicated the throughput, while the horizontal axis has indicated the printing time. However, these axes may be reversed.

(Still Another Embodiment)

As a matter of course, the invention can also be implemented when a storage medium (or a recording medium) for storing a program code of software for implementing the functions of the embodiment shown in FIG. 16, FIG. 17, and FIG. 27 through FIG. 30 is provided for a system or an apparatus so that a computer (or a CPU or an MPU) of the system or the apparatus reads out and executes the program code stored in the storage medium.

In this case, the program code itself read out from the storage medium realizes the functions of the above-mentioned embodiment. The storage medium which stores the program code constitutes the present invention. Further, the scope of the invention includes not only the case that the computer reads out and executes the program code so that the functions of the above-mentioned embodiment are implemented but also the case that on the basis of instructions of the program code, an operating system (OS) or the like operating on the computer performs all or part of the actual processing so that the functions of the above-mentioned embodiment are implemented in the processing.

Further, the scope of the invention includes the case that the program code read out from the storage medium is written into a storage medium provided in a function enhancement card inserted into the computer or a function enhancement unit connected to the computer, and then on the basis of instructions of the program code, a CPU or the like provided in the function enhancement card or the function enhancement unit performs all or part of the actual processing so that the functions of the above-mentioned embodiment are implemented in the processing.

Furthermore, it is a matter of course that the invention can also be implemented when the program code of the software which realizes the functions of the above-mentioned embodiment is distributed via a network and then stored in storage means such as a hard disk and a memory of the system or the apparatus or in a storage medium such as a CD-RW and a CD-R so that a computer (or a CPU or an MPU) of the system or the apparatus reads out and executes the program code stored in the storage means or the storage medium.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2004-149520 filed May 19, 2004, which is hereby incorporated by reference herein.

What is claimed is:

1. An information processing apparatus for performing scheduling of a print job for a printing apparatus, the information processing apparatus comprising:
    a displaying unit configured to cause a display section to display:
    a scheduling region defined by first and second axes where the first axis indicates capability of the printing apparatus and the second axis indicates print time; and
    a job element in the scheduling region, a length of the job element along the first axis corresponding to the capability of the printing apparatus which is used for the print job corresponding to the job element, and a length of the job element along the second axis corresponding to the print time required for the print job with the capability of the printing apparatus which is used for the print job; and
    a designation unit configured to designate the length of the job element along the first axis and the length of the job element along the second axis by a dragging operation of the job element;
    a control unit configured to determine the length of the job element along the first axis and a printing apparatus which is used for the print job based on information of the print job corresponding to the job element in a case where the designation unit designates the length of the job element along the second axis by the dragging operation of the job element, and determine the length of the job element along the second axis and the print time required for the print job based on information of the print job corresponding to the job element in a case where the designation unit designates the length of the job element along the first axis by the dragging operation of the job element.

2. An information processing apparatus as claimed in claim 1, wherein the control unit moves the job element within the scheduling region, in response to the dragging operation of the job element.

3. An information processing apparatus as claimed in claim 1, wherein the control unit changes the length of the first and the second axes, according to a combination of capability of a plurality of printing apparatuses capable of being used for the print job.

4. An information processing apparatus as claimed in claim 1, wherein the display unit displays a property of the print job corresponding to the job element displayed.

5. An information processing apparatus as claimed in claim 1, wherein the display unit displays a delivery due date element which indicates a delivery due date of the print job corresponding to the job element displayed.

6. An information processing apparatus as claimed in claim 1, further comprising a first forbidding unit configured to forbid the control-unit to forbid the control unit to arrange the job element being scheduled on a range that overlaps with the job element which has been already arranged, when the job element corresponding to another-print job is arranged in the scheduling region.

7. An information processing apparatus as claimed in claim 1, further comprising a second forbidding unit configured to forbid, when there is a printing apparatus not used for printing the print job, the control unit to arrange the job element being scheduled on a range that corresponds to the capability of the printing apparatus not used for printing.

8. An information processing apparatus as claimed in claim 1, further comprising:
    a mask unit configured to, when there is a printing apparatus not used for printing, display in the scheduling region a predetermined indication for a range corresponding to the capability of the printing apparatus not used for printing and forbid arrangement of the job element in the range indicated; and an allocating unit configured to allocate the job element, which corresponds to the print job having used the printing apparatus not used for printing or the print job is to use the printing apparatus not used for printing, to another printing apparatus, wherein, when at least a part of the job element allocated by the allocating unit is arranged on a print time range after the delivery due date of the print job, the control unit changes the length corresponding to the capability to be used for the print job so that the job element is arranged in the range not crossing over the due date, in a direction of the first or the second axis corresponding to the time required for printing.

9. An information processing apparatus as claimed in claim 8, wherein, when the printing apparatus is restored to be capable of being used, the mask unit performs control of clearing of the scheduling region the predetermined indication corresponding to the capability of the restored printing apparatus.

10. An information processing apparatus as claimed in claim 9, further comprising a re-allocating unit configured to allocate the job element corresponding to the print job having used the restored printing apparatus before the printing apparatus was not used, so that the job element is allocated to the printing apparatuses of the capability including the capability of the restored printing apparatus.

11. A control method for controlling an information processing apparatus of performing scheduling of a print job for a printing apparatus, the control method comprising:

a displaying step of causing a display section to display:

a scheduling region defined by first and second axes where the first axis indicates capability of the printing apparatus and the second axis indicates print time; and a job element in the scheduling region, a length of the job element along the first axis corresponding to the capability of the printing apparatus which is used for the print job corresponding to the job element, and a length of the job element along the second axis corresponding to the print time required for the print job with the throughput of the printing apparatus which is used for the print job; and a designation step of designating the length of the job element along the first axis and the length of the job element along the second axis by a dragging operation of the job element;

a control step of determining the length of the job element along the first axis and a printing apparatus which is used for the print job based on information of the print job corresponding to the job element in a case where the length of the job element along the second axis is designated by the dragging operation of the job element, and determining the length of the job element along the second axis and the print time required for the print job based on information of the print job corresponding to the job element in a case where the length of the job element along the first axis is designated by the dragging operation of the job element.

12. A control method as claimed in claim 11, wherein the display change step moves the job element within the scheduling region, in response to the dragging operation of the job element.

13. A control method as claimed in claim 11, wherein the control step changes the length of the first and second axes, according to a combination of capability of a plurality of printing apparatuses capable of being used for the print job.

14. A control method as claimed in claim 11, wherein the display section displays a property of the print job corresponding to the job element displayed.

15. A control method as claimed in claim 11, wherein the display step displays a delivery due date element which indicates a delivery due date of the print job corresponding to the job element displayed.

16. A control method as claimed in claim 11, further comprising a first forbidding step of forbidding the control step to arrange the job element being scheduled in a range that overlaps with the job element which has been already arranged, when the job element corresponding to another print job is arranged in the scheduling region.

17. A control method as claimed in claim 11, further comprising a second forbidding step of forbidding, when there is a printing apparatus not used for printing the print job, the control step to arrange the job element being scheduled in a range that corresponds to the capability of the printing apparatus not used for printing.

18. A control method as claimed in claim 11, further comprising:

a masking step of, when there is a printing apparatus not used for printing, displaying in the scheduling region a predetermined indication for a range corresponding to the capability of the printing apparatus not used for printing and performing control of forbidding arrangement of the job element in the range indicated; and an allocating step of allocating the job element, which corresponds to the print job having used the printing apparatus not used for printing or the print job is to use the printing apparatus not used for printing, to another printing apparatus, wherein, when at least a part of the job element allocated by the allocating step is arranged in a print time range after the delivery due date of the print job, the control step changes the length corresponding to the capability to be used for the print job so that the job element is arranged in the range not crossing over the due date, in a direction of the first or the second axis corresponding to the time required for printing.

19. A control method as claimed in claim 18, wherein, when the printing apparatus is restored to be capable of being used, the masking step performs control of clearing of the scheduling region the predetermined indication corresponding to the capability of the restored printing apparatus.

20. A control method as claimed in claim 19, further comprising a re-allocating step of allocating the job element corresponding to the print job having used the restored printing apparatus before the printing apparatus was not used, so that the job element is allocated to the printing apparatuses of the capability including the capability of the restored printing apparatus.

21. A storage medium storing a program for performing an information processing of performing scheduling of a print job for a printing apparatus, the program causing an information processing apparatus to execute:

a displaying step of causing a display section to display:

a scheduling region defined by a first and a second axes where the first axis indicates capability of the printing apparatus and the second axis indicates print time; and a job element in the scheduling region, a length of the job element along the first axis corresponding to the capability of the printing apparatus which is used for the print job corresponding to the job element, and a length of the job element along the second axis corresponding to the print time required for the print job with the capability of the printing apparatus which is used for the print job; and
a designation step of designating the length of the job element along the first axis and the length of the job element along the second axis by a dragging operation of the job element;
a control step of determining the length of the job element along the first axis and a printing apparatus which is used for the print job based on information of the print job corresponding to the job element in response to a case where the length of the job element along the second axis is designated by the dragging operation of the job element, and determining the length of the job element along the second axis and the print time required for the print job based on information of the print job corresponding to the job element in a case where the length of the job element along the first axis is designated by the dragging operation of the job element.

22. An information processing apparatus for performing scheduling of a product produced in a producing apparatus, the information processing apparatus comprising:
a displaying unit configured to cause a display section to display;
a scheduling region defined by a first and a second axes where the first axis indicates capability of the producing apparatus and the second axis indicates time required for producing; and
a job element in the scheduling region, a length of the job element along the first axis corresponding to the capability of the producing apparatus which is used for producing the product corresponding to the job element, and a length of the job element along the second axis corresponding to the time required for producing the product with the capability of the producing apparatus which is used for producing the product; and
a designation unit configured to designate the length of the job element along the first axis and the length of the job element along the second axis by a dragging operation of the job element;
a control unit configured to determine the length of the job element along the first axis and a printing apparatus which is used for producing the product based on information of the product corresponding to the job element in a case where the designation unit designates the length of the job element along the second axis by the dragging operation of the job element, and determine the length of the job element along the second axis and the time required for producing the product based on information of the product corresponding to the job element in a case where the designation unit designates the length of the job element along the first axis by the dragging operation of the job element.

23. A control method for controlling an information processing method of performing scheduling of a product produced in a producing apparatus, the control method comprising:
a displaying step of causing a display section to display;
a scheduling region defined by a first and a second axes where the first axis indicates capability of the producing apparatus and the second axis indicates time required for producing; and
a job element in the scheduling region, a length of the job element along the first axis corresponding to the capability of the producing apparatus which is used for producing the product corresponding to the job element, and a length of the job element along the second axis corresponding to the time required for producing the product with the capability of the producing apparatus which is used for producing said product; and
a designation step of designating the length of the job element along the first axis and the length of the job element along the second axis by a dragging operation of the job element;
a control step of determining the length of the job element along the first axis and a printing apparatus which is used for producing the product based on information of the product corresponding to the job element in a case where the length of the job element along the second axis is designated by the dragging operation of the job element, and determining the length of the job element along the second axis and the time required for producing the product based on information of the product corresponding to the job element in a case where the length of the job element along the first axis is designated by the dragging operation of the job element.

* * * * *